US012682610B1

(12) United States Patent
Sundar et al.

(10) Patent No.: US 12,682,610 B1
(45) Date of Patent: Jul. 14, 2026

(54) MULTIMEDIA CONTENT ENCODING

(71) Applicant: Amazon Technologies, Inc., Seattle, WA (US)

(72) Inventors: Harshavardhan Sundar, New York, NY (US); Nagaraj Mahajan, Allston, MA (US); Viktor Rozgic, Belmont, MA (US); Sai Kiran Venkata Subramanya Rupanagudi, Burien, WA (US); Chao Wang, Newton, MA (US); Siddharth Kashiramka, Alexandria, VA (US)

(73) Assignee: Amazon Technologies, Inc., Seattle, WA (US)

( * ) Notice: Subject to any disclaimer, the term of this patent is extended or adjusted under 35 U.S.C. 154(b) by 561 days.

(21) Appl. No.: 18/082,655

(22) Filed: Dec. 16, 2022

(51) Int. Cl.
*G06V 10/774* (2022.01)
*G06V 10/764* (2022.01)
*G10L 25/51* (2013.01)

(52) U.S. Cl.
CPC .......... *G06V 10/774* (2022.01); *G06V 10/764* (2022.01); *G10L 25/51* (2013.01)

(58) Field of Classification Search
None
See application file for complete search history.

(56) References Cited

U.S. PATENT DOCUMENTS

2020/0117887 A1*  4/2020  Chaudhuri .............. G10L 25/78
2020/0250538 A1*  8/2020  Li ........................... G06F 18/22
2024/0169186 A1*  5/2024  Zang ...................... G06N 3/084

* cited by examiner

*Primary Examiner* — Leon Flores
(74) *Attorney, Agent, or Firm* — Pierce Atwood LLP

(57) ABSTRACT

Methods and systems configured to embed data representing content output by at least one device for downstream content recognition or other downstream processes. For example, a device operates one or more media data embedding components configured to embed information regarding the output media, such as audio or image content. The embedding component is trained to embed information for a subset of known downstream processes with some known processes deliberately held out from the training. Among other benefits, this approach can help reduce over customization of the embedding component and allow more information to preserved by the component for purposes of downstream operations that may yet be configured.

19 Claims, 12 Drawing Sheets

Spectrogram
440

Feature Data
445

Feature Data
460

FIG. 6

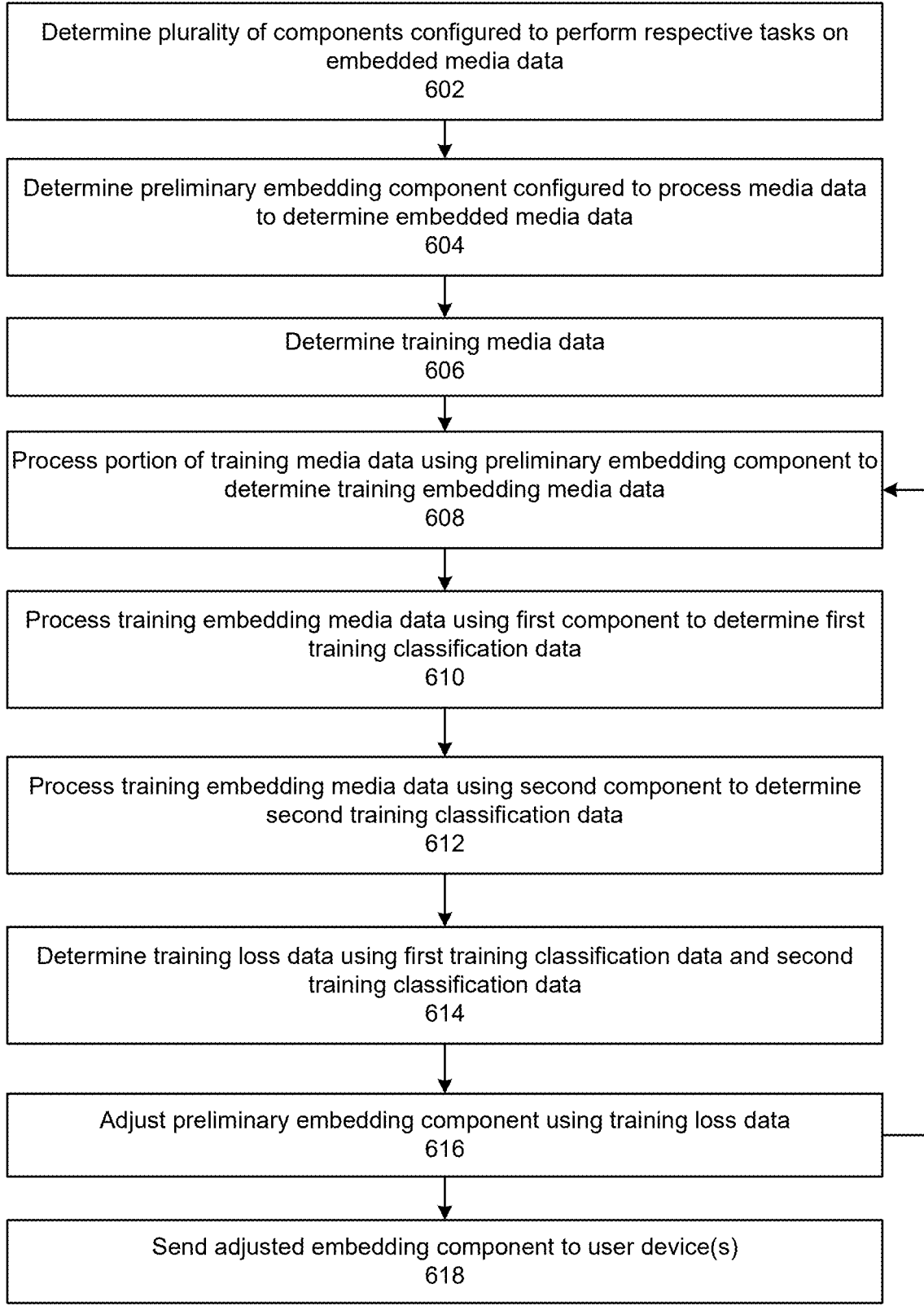

Determine plurality of components configured to perform respective tasks on embedded media data
602

Determine preliminary embedding component configured to process media data to determine embedded media data
604

Determine training media data
606

Process portion of training media data using preliminary embedding component to determine training embedding media data
608

Process training embedding media data using first component to determine first training classification data
610

Process training embedding media data using second component to determine second training classification data
612

Determine training loss data using first training classification data and second training classification data
614

Adjust preliminary embedding component using training loss data
616

Send adjusted embedding component to user device(s)
618

FIG. 7

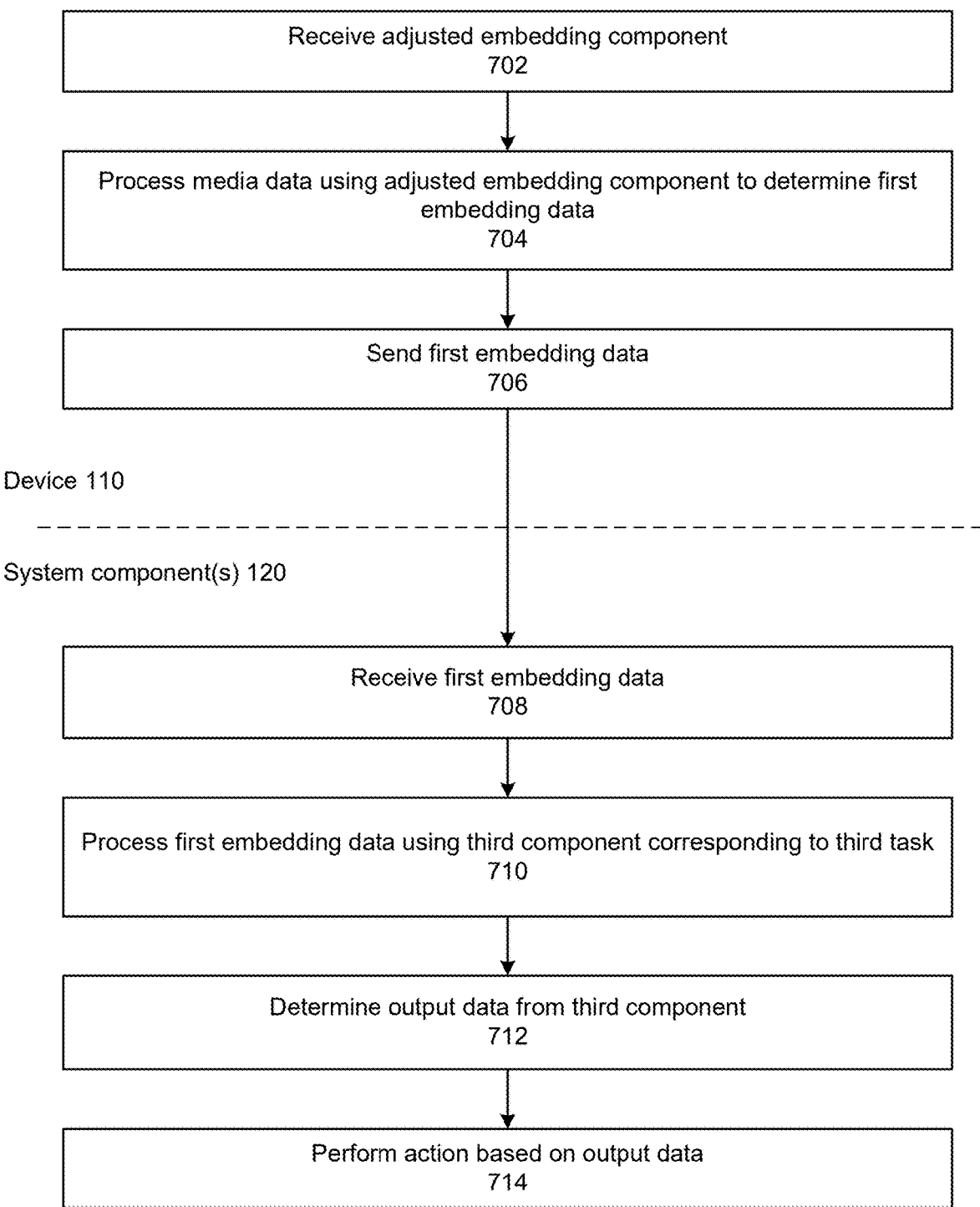

Receive adjusted embedding component
702

Process media data using adjusted embedding component to determine first embedding data
704

Send first embedding data
706

Device 110

- - - - - - - - - - - - - - - - - - - - - - - - - - - - - - - - - - - - - -

System component(s) 120

Receive first embedding data
708

Process first embedding data using third component corresponding to third task
710

Determine output data from third component
712

Perform action based on output data
714

FIG. 8

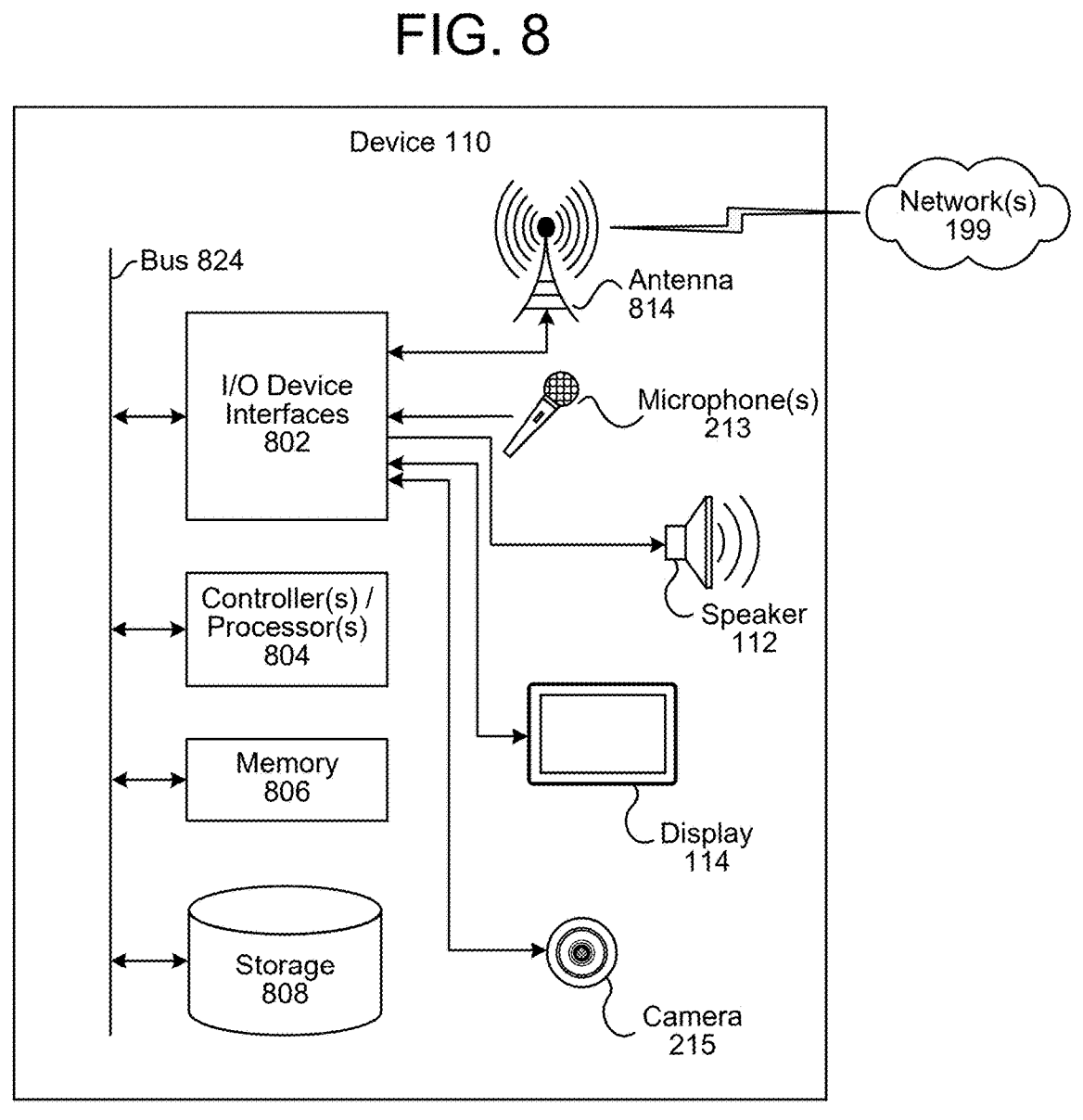

Network(s)
199

Device 110

Antenna
814

Microphone(s)
213

Speaker
112

Display
114

Camera
215

Bus 824

I/O Device
Interfaces
802

Controller(s) /
Processor(s)
804

Memory
806

Storage
808

MULTIMEDIA CONTENT ENCODING

BACKGROUND

With the advancement of technology, the use and popularity of electronic devices has increased considerably. Electronic devices are commonly used to generate play media content.

BRIEF DESCRIPTION OF DRAWINGS

For a more complete understanding of the present disclosure, reference is now made to the following description taken in conjunction with the accompanying drawings.

FIG. 6 illustrates techniques for training embedding generation component(s) according to embodiments of the present disclosure.

FIG. 7 illustrates techniques for operating embedding generation component(s) at runtime/inference according to embodiments of the present disclosure.

FIG. 8 is a block diagram conceptually illustrating example components of a device, according to embodiments of the present disclosure.

DETAILED DESCRIPTION

Figure 1A:
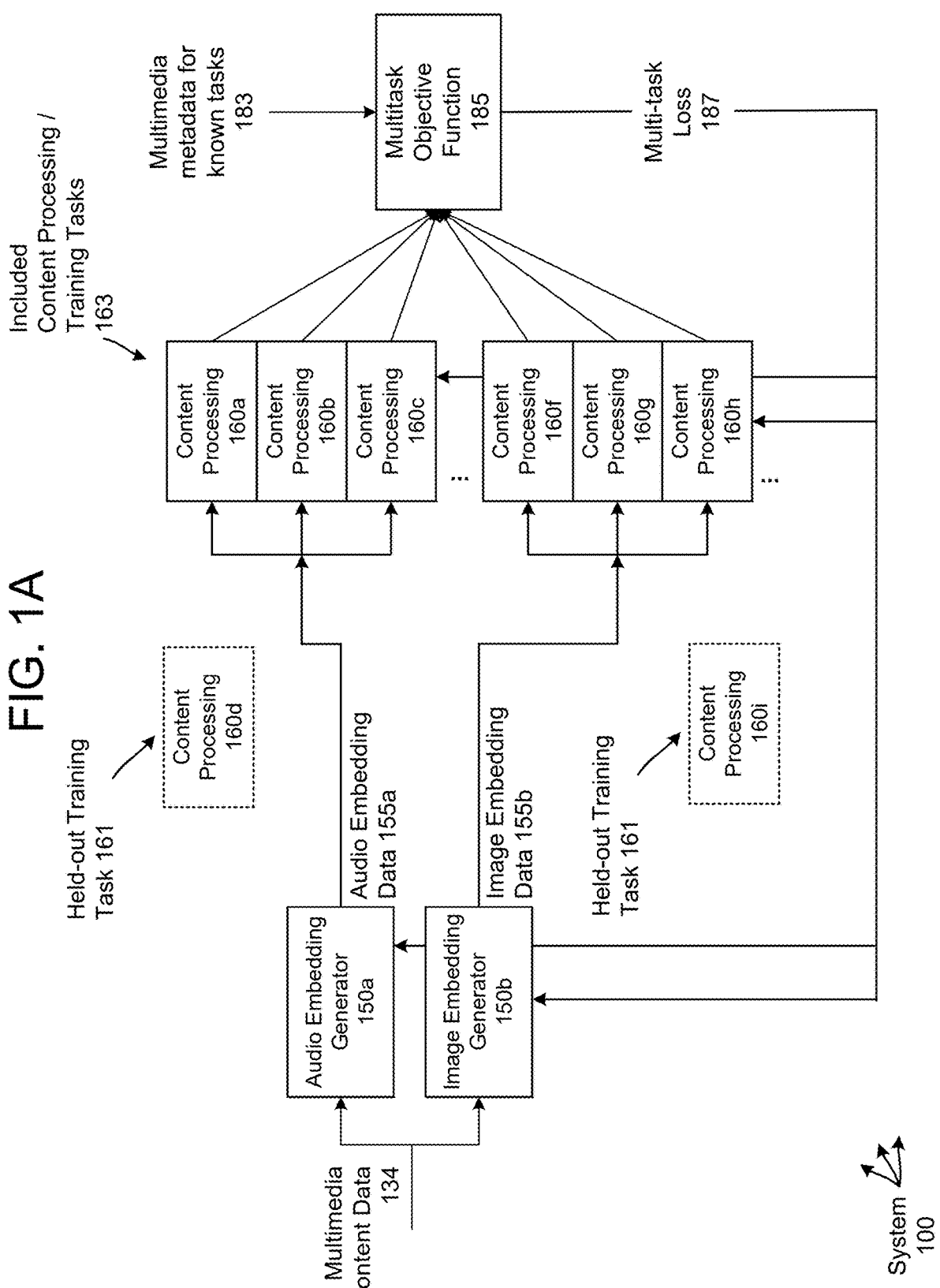
FIG. 1A illustrates a system configured to train embedding generation component(s) according to embodiments of the present disclosure.

Electronic devices may be used to output media content to a user. For example, a device may be configured to receive playback audio data and generate playback audio using one or more loudspeakers. Additionally or alternatively, the device may be configured to receive image data representing a single image or video and output the image/video on a display of the device. Thus, the device may play media content (e.g., music, television show, movie, etc.) for the user using the loudspeakers and/or the display.

In certain configurations it may be beneficial to capture information regarding the particular output of the device. For example, a user may desire to keep a log of the content that a particular device is playing. Such a content log may be useful for a number of purposes, for example, ensuring that child devices are only outputting approved content, determining which advertisements are output at what times and by what devices, or the like. In other examples, a system, for example a cloud system, may perform various processing that depends on the output of the device. Such processing may include, but is not limited to, analyzing the output of the device to make future media content recommendations to a user, performing speech processing that may be dependent upon the output of a device, recognizing objects referred to in the media content, identifying a language being spoken for potential translation, etc. As can be appreciated, there are a number of different operations and/or services that may be performed/offered depending on the media content being output by a device.

It may be undesirable, in some use cases, to send an exact copy of the media content being output by the device to another system for various reasons, including privacy, bandwidth constraints, use of device computing resources, etc. Further, while metadata information (such as content identifiers or the like) may be available, it may not be feasible to rely exclusively on such metadata to identify what content is output as such metadata may not be uniform across content sources, may not be available for all content, and/or other reasons that prevent metadata alone from offering a comprehensive solution.

One approach for identifying content output by a device may include capturing a small piece of data representative of the content, which may be used by a downstream system component to identify the content item. Such a small piece of data may include a fingerprint represented as fingerprint data. For example, the fingerprint may include an audio fingerprint, image fingerprint, wireless signal fingerprint (e.g., devices may output certain content at certain time, such as those used for a self-guided walking tour, so device's wireless signal identifier could be used to identify content), or any other type of fingerprint, to represent the content being output. In many circumstances, such fingerprints can be customized for the downstream processing that will be performed on them. For example, if a downstream component is configured to match output audio content with a music catalog, the component that creates an audio fingerprint using output audio data may be customized for the music operation to most efficiently represent the audio data for the downstream music matching. Similarly, a downstream component that matches image content to a movie catalog may rely on an image fingerprint that is customized to capture/represent image data in a manner that efficiently represents the image data for the movie matching. In the context of components that rely on machine learning techniques, such scenarios may involve joint training of the component that is to create the fingerprint and the component that is to use the fingerprint (e.g., perform content matching). Thus, the fingerprint, and the underlying data represented by the fingerprint, may include data customized/optimized for the very specific downstream purpose of identifying a song, movie, or the like that matches the fingerprint. As a result, such fingerprints may not capture data relating to the device's output content that would be useful for other purposes beyond the specific content matching.

It may be possible to customize a fingerprint component (or other encoding component) for each downstream operation that may rely on a device's output content. For example, a system can include one downstream component (such as a "cloud" component located in a physical space remote from or at least external to the user device) to perform face recognition of onscreen actors, another downstream component may perform channel recognition, another may perform landmark/scene recognition, another may perform object recognition, etc. For a system with many such components, each component may have its own customized encoder that is configured to capture the information needed to perform the specific downstream function(s). Thus, a device that outputs content may need to operate each of these customized encoding components when outputting content, and may have to send the resulting multiple instances of encoded data, which may drain a certain amount of computing resources of the device. Further, each time a new downstream component is added (or updated) that can operate on data resulting from the device's output content, the system may need to train a new customized encoder and deliver that encoder to each local device that is to operate it. With many such devices (such as devices that are capable of audio playback, video playback, headless devices that can control playback for other devices, etc.), there can be many thousands of different device types and billions of individual devices. It can therefore be potentially prohibitive both from a system perspective and from a network perspective to have a customized encoder for each downstream operation.

Offered are, among other things, techniques, methods, and systems for configuring one or more media encoder components (such as an audio embedding generator and image embedding generator) that are trained to capture a variety of information relative content being output by a device. Such information may include information that is usable not only by existing downstream components but also information that may be useful to downstream components that do not yet exist. As a result, the resulting embedding generator(s) are trained to avoid being overly focused on information that is known to be useful for a specific purpose and are more inclusive of encoding information that may not have a specified downstream purposes just in case such information may be desired in the future. Among other technical benefits, the system can distribute data (such as one or more trained models) configured to be operated by an embedding component with less frequency than might otherwise be necessary with multiple customized embedding components. Further, a local device (e.g., the user device) may operate only one or other number of such embedding components (e.g., a subset of the available components) and send the resulting output data from those components that may then be used by many downstream components rather than a local device operating one embedding component for each downstream processor.

FIG. 1A illustrates a system 100 for a high level operation for training an audio embedding generator 150a and an image embedding generator 150b that can be used to create respective embedding data 155a/155b from multimedia content data 134. Such embedding data 155a/155b may be used by many downstream content processing components 160 to perform various operations. Such embedding generators 150a and 150b may use significantly fewer computing resources for operation by a device than if each content processing component 160a-160f required a customized embedding generator. As explained below, once trained, the audio embedding generator 150a and image embedding generator 150b may be deployed to many user devices for processing related to output media content and ultimate varied downstream operations.

Figure 1B:
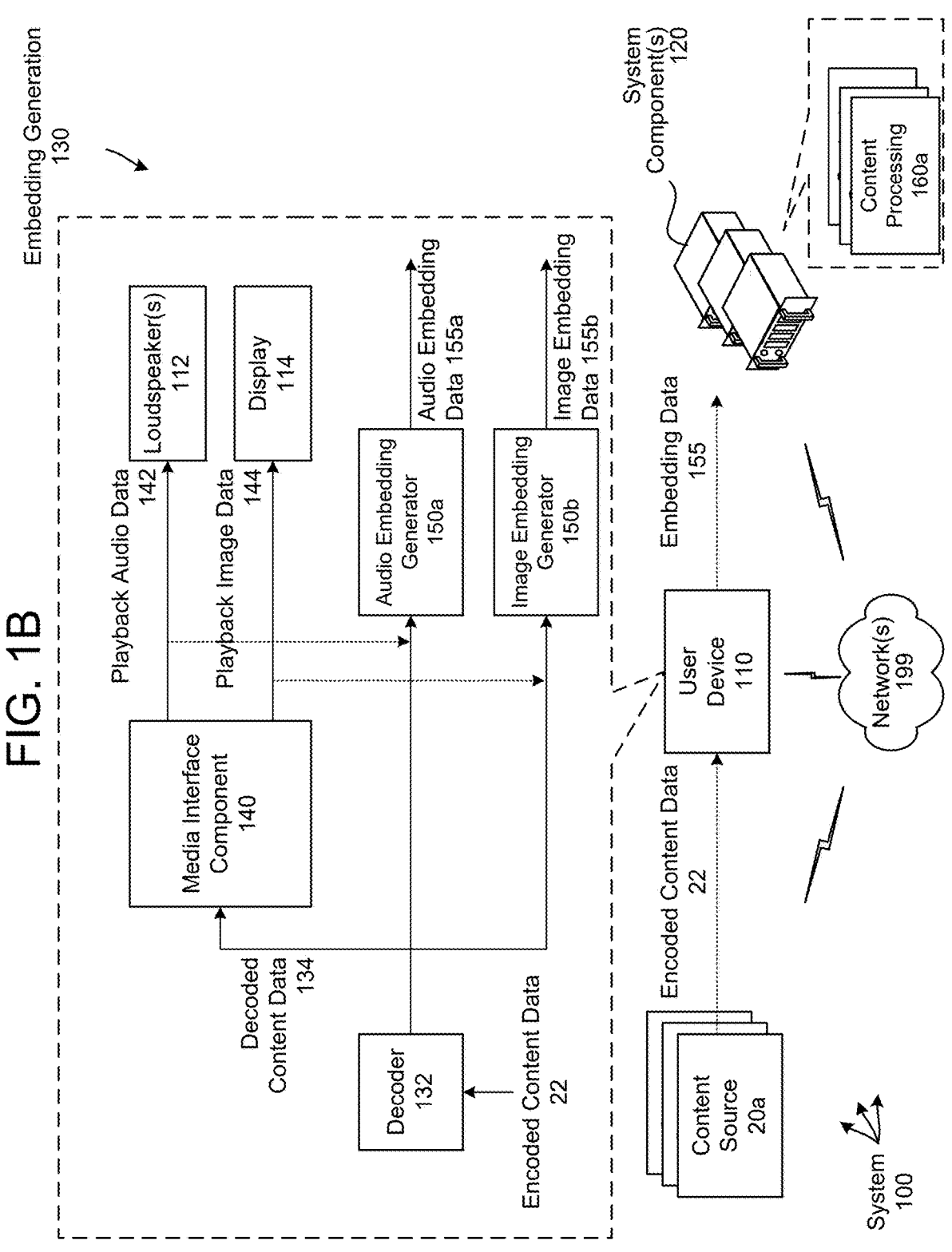
FIG. 1B illustrates a system configured to generate embedding data during runtime operations according to embodiments of the present disclosure.

FIG. 1B illustrates a high-level conceptual block diagram of the system 100 configured to generate embedding data based on output media content at runtime/inference, according to embodiments of the present disclosure. Although certain figures/discussion illustrate the operation of the system in a particular order, the steps described may be performed in a different order (as well as certain steps removed or added) without departing from the intent of the disclosure. As illustrated in FIG. 1B, the system 100 may include a user device 110 that may be communicatively coupled to network(s) 199. In addition, the system 100 may include one or more content sources 20, one or more system component(s) 120, and/or additional devices (not illustrated) that may be communicatively connected to the device 110 via the network(s) 199, although the disclosure is not limited thereto.

The device 110 may be an electronic device configured to receive playback audio data and generate playback audio (e.g., output audio) using one or more loudspeakers of the device 110 or of a connected device. For example, the device 110 may generate playback audio corresponding to media content, such as music, a movie, and/or the like, although the disclosure is not limited thereto. In one example, the device 110 may include the loudspeaker(s) as part of its internal constructions, such as with devices 110a or 110b as those illustrated in FIG. 10. In another example, the device 110 may be a headless/input/output (I/O) limited device which may generate audio data for playback using loudspeakers(s) of another device, such as a device 110c illustrated in FIG. 10. Such an I/O limited device may include, for example, a FireTV stick or other such device. Similarly, as part of outputting media content for a user, the device 110 may generate the playback image(s) and/or video on a display of the device 110 or for the display of another device. For example, the device 110 may generate a playback image corresponding to media content, such as a program, a movie, and/or the like, although the disclosure is not limited thereto. In one example, the device 110 may include the display as part of its internal constructions, such as with devices 110a illustrated in FIG. 10. In another example, the device 110 may be a headless/input/output (I/O) limited device which may generate image data for playback using a display of another device, such as a device 110c illustrated in FIG. 10. In order to enable additional functionality, the system 100 may perform various downstream operations depending on the output content, for example performing content recognition to determine the media content being output by the device 110, enhancing content recommendations, identifying the media content may enable enhanced entity resolution, which allows the system 100 to interpret voice commands based on the specific media content being output to the user, although the disclosure is not limited thereto.

As part of outputting the media content to the user, in some examples the device 110 may receive the media content as encoded content data 22 from a content source 20. For example, the content source 20 may generate the encoded content data 22 in order to protect the media content from piracy and/or copying while the media content is being transmitted to the device 110 via a network, such as network(s) 199. In some examples, the content source 20 may generate the encoded content data 22 using a Digital Rights Management (DRM) system that (i) uses encryption to protect the media content, (ii) uses specialized techniques to securely store and deliver encryption/decryption keys associated with the encryption, and/or (iii) allows content publishers to set business rules and control who can consume their media content (expiry times, etc.).

To illustrate an example, the content source 20 may encrypt the media content using a content encryption key (CEK) and/or the like, such that the device 110 must know the CEK in order to decode the encoded content data 22 and output the media content. For example, the CEK may be shared or somehow delivered to a user profile associated with the device 110, enabling the device 110 and only the device 110 to decode the encoded content data 22, although the disclosure is not limited thereto.

In one example, a content source 20a may correspond to a device of a video-on-demand service that sends encoded video content 22a to a device 110 for playback. In another example, a content source 20b may correspond to a device of a satellite-radio service that sends encoded audio content 22b to a device 110 for playback. In another example, a content source 20c may correspond to a device of a music streaming service that sends encoded audio content 22c to a device 110 for playback. In still another example, a content source 20d may correspond to a social media application that sends encoded video content 22d to a device for playback. As can be appreciated, many different examples of content source 20/encoded content data 22 may be possible depending on system configuration.

In the example illustrated in FIG. 1B, the device 110 receives the encoded content data 22 representing the media content from a first content source 20a of a plurality of content sources. For example, the first content source 20a may correspond to storage and/or routing components associated with a first content provider and the first content source 20a may be configured to provide media content and/or other data to the device 110 upon request.

In some examples, the first content source 20a may correspond to an entertainment platform (e.g., cable provider, streaming service, subscription service, and/or the like, although the disclosure is not limited thereto) that is associated with the user profile. For example, the user profile may include login information and/or other account credentials that enable the device 110 to authorize and/or validate an account associated with the first content source 20a. However, the disclosure is not limited thereto and the first content source 20a may provide the media content and/or other data free of charge and/or without verifying account information without departing from the disclosure.

To select the media content to output, the device 110 may offer a user interface that enables the user to browse and select from a collection of media content items associated with the first content source 20a. For example, the user interface may allow the user to select between multiple content sources 20 associated with the user profile, and then browse a collection of media content items associated with the selected content source in order to choose the media content item that the device 110 will output. In some examples, the media content may correspond to audio data, image data, and/or video data without departing from the disclosure. Selection of media content may come through a spoken utterance including a playback command, a graphical user interface input, or a variety of other input processes.

To illustrate an example, the media content may include audio data representing music, speech, and/or other audible sounds, image data representing individual picture(s) (e.g., still images) or a series of images (e.g., video), a combination thereof, and/or the like without departing from the disclosure. For example, the media content may correspond to songs, radio broadcasts, audiobooks, video clips, television shows, movies, and/or other data representing other forms of entertainment without departing from the disclosure. While in some examples the media content may be available upon request (e.g., on-demand streaming), the disclosure is not limited thereto and in other examples the media content may correspond to radio broadcasts, television channels, cable television broadcasts, and/or the like without departing from the disclosure.

After the user selects the media content, the device 110 may send a request for the media content to the first content source 20a and the first content source 20a may begin delivery of the media content by sending the encoded content data 22 to the device 110 via the network(s) 199. As illustrated in FIG. 1B, the device 110 may receive the encoded content data 22 and perform decoding to output the media content using one or more output devices associated with the device 110. For example, the device 110 may include a decoder component 132 that is configured to receive the encoded content data and generate decoded content data 134. The decoder component 132 may send the decoded content data 134 to the output devices, such as a loudspeaker(s) 112 and/or a display 114, via a media interface component 140.

If the media content only corresponds to audio data and does not include any image data, the decoded content data 134 may correspond to playback audio data 142 and the media interface component 140 may send the playback audio data 142 to the loudspeaker(s) 112 to generate output audio. In contrast, if the media content only corresponds to image data (e.g., either image(s) or video) and does not include any audio data, the decoded content data 134 may correspond to playback image data 144 and the media interface component 140 may send the playback image data 144 to the display 114 to render the video on the display 114. However, if the media content corresponds to a combination of audio data and image data, then the decoded content data 134 may include the playback audio data 142 along with the playback image data 144. Thus, the media interface component 140 may send the playback audio data 142 to the loudspeaker(s) 112 and may send the playback image data 144 to the display 114.

While FIG. 1B illustrates the display 114 as being included in the device 110, the disclosure is not limited thereto. In some examples, the display 114 may be an external display, such as a television or computer monitor, that is connected to the device 110, via a wired connection, without departing from the disclosure. For example, the device 110 may send the playback image data 144 to the display 114 using a high-definition multimedia interface (HDMI) component or other such component without departing from the disclosure. Such a media interface component 140 is configured to configure the decoded content data 134 into a form operable by an output component, such as a loudspeaker 112, display, 114, or the like. While illustrated as part of the device 110, the loudspeaker(s) 112 may be external to the device 110 without departing from the disclosure. In some examples, the loudspeaker(s) 112 may be associated with the display 114 and the device 110 may send both the playback audio data 142 and the playback image data 144 using the HDMI component, although the disclosure is not limited thereto.

In addition to outputting the media content to the user, the device 110 may enable additional functionality by performing embedding generation 130 to generate embedding data 155 representing individual segments of the decoded content data 134. As illustrated in FIG. 1B, the device 110 may include a embedding generator component 150 that may process the decoded content data 134 and generate the embedding data 155.

Depending on whether the decoded content data 134 includes the playback audio data 142 and/or the playback image data 144, the embedding data 155 may include one or more data vectors of audio embedding data 155a and/or one or more data vectors of image embedding data 155b without departing from the disclosure. As used herein, audio embedding data 155a may correspond to first data that includes a representation of a segment of the decoded audio data, while image embedding data 155b may correspond to second data that includes a representation of a segment of the decoded image data. However, the disclosure is not limited thereto, and in other examples the embedding data 155 may include a plurality of audiovisual embedding vectors (e.g., each with combined audio and image data) and/or the like without departing from the disclosure. For example, an audiovisual embedding vector (e.g., multimedia vector, combined vector, etc.) may correspond to third data that includes an embedded representation of a segment of the decoded playback data (e.g., both the decoded audio data and the decoded image data) without departing from the disclosure, although the disclosure is not limited thereto.

As shown in FIG. 1B, a device 110 may process audio data and/or image data to generate audio embedding data 155a and/or image embedding data 155b. Audio embedding data 155a may be created by the audio embedding generator 150a based on decoded media data output by decoder 132 and/or based on playback audio data 142 output by media interface component 140. The audio embedding data 155a may encode/embed certain information about the underlying audio data. Image embedding data 155b may be created by the image embedding generator 150b based on decoded media data output by decoder 132 and/or based on playback image data 144 output by media interface component 140. The image embedding data 155b may encode/embed certain information about the underlying image data. The precise information embedded (e.g., audio and/or image) may depend on how the specific generator component(s) 150 are trained, as discussed herein. The embedded information is able to be used by various content processing component(s) 160 to perform various processing based on the media content output by the device 110.

Figure 2:
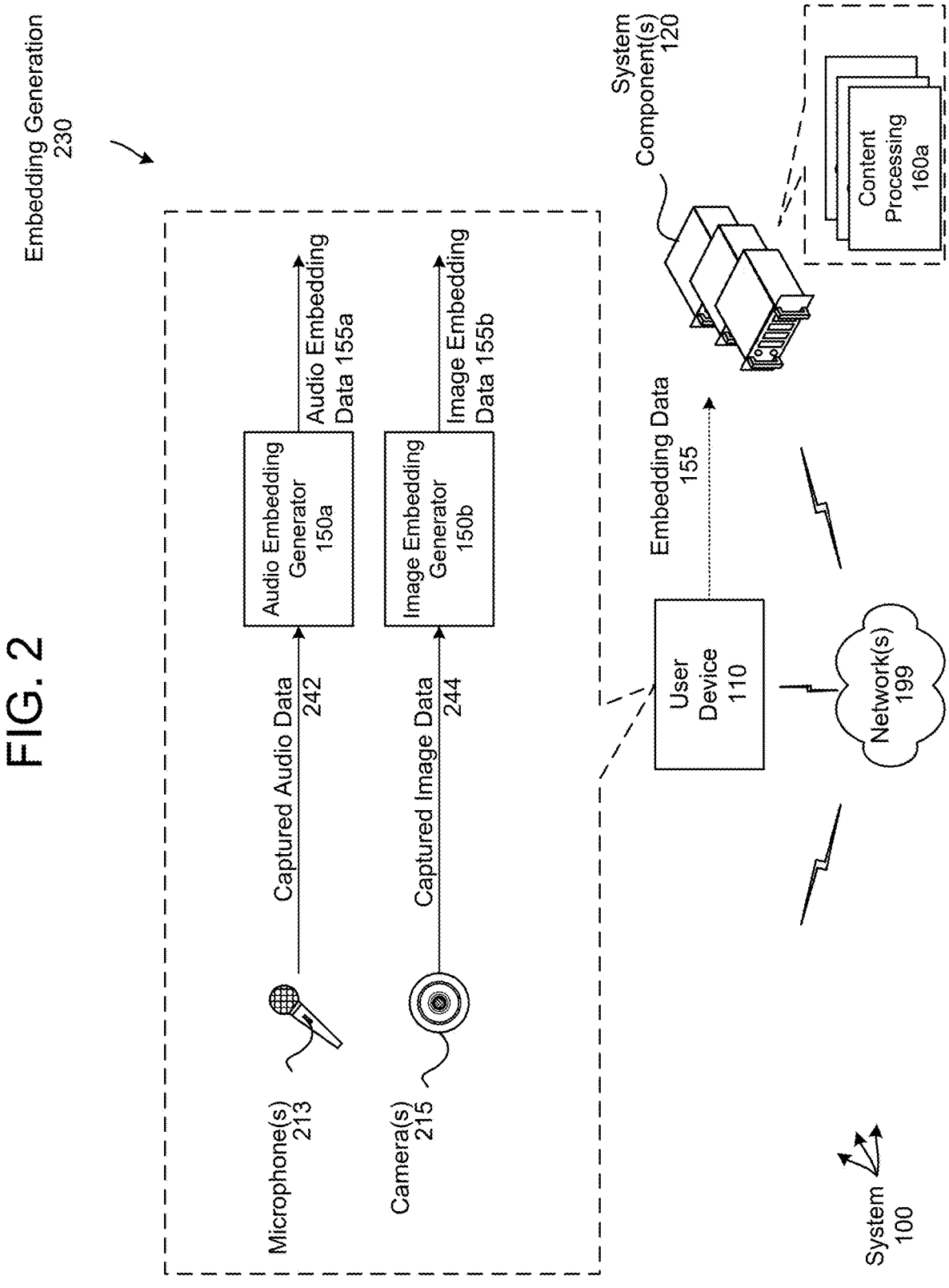
FIG. 2 illustrates a system configured to generate embedding data during runtime operations according to embodiments of the present disclosure.

A device 110 may also determine embedded audio and/or image data from data sources other than those that originated from a content source. For example, embedding generation 230 may be performed as shown in FIG. 2. As shown, a device 110 may determine captured audio data 242 as a result of audio captured by one or more microphone(s) 213. The device 110 may then embed that captured audio data 242 using audio embedding generator 150a to determine audio embedding data 155a. The device 110 may also determine captured image data 244 as a result of image(s) captured by one or more camera(s) 215. The device 110 may then embed that image audio data 244 using image embedding generator 150b to determine image embedding data 155b. The captured audio data 242 and/or captured image data 244 may also be received from one or more microphone(s) 213 and/or camera(s) 215 that are not necessarily part of device 110 but may be part of another device which may send the captured audio data 242 and/or captured image data 244 to the device 110 (for example another microphone(s) 213 and/or camera(s) 215 in a home, associated with a same user profile, etc.). The device may then send the embedding data 155 to the system component(s) 120 for processing by a content processing component(s) 160. In this way a content processing component(s) 160 may process embedding data representing an environment of a device 110 (and/or other device) as represented by the captured audio data 242 and/or captured image data 244

The content processing component(s) 160 may correspond to a variety of functionalities. In one example, a content processing component 160a may correspond to an event detection component that is configured to process audio embedding data 155a, for example using or more machine learning model, to perform acoustic event detection. Such a component may determine if a particular event occurred based on the audio of content being output by a device, for example by processing the audio embedding data

155b with respect to data representing known events. For example, a glass breaking, door slamming, or the like. In another example, a content processing component 160b may correspond to an emotion classification component that is configured to process audio embedding data 155a, for example using or more machine learning model, to perform emotion classification. Such a component may determine if a particular individual represented in content being output by a device reflects a particular emotion such as being happy, angry, sad, etc. based on the audio of the content. In another example, a content processing component 160c may correspond to a language identification component that is configured to process audio embedding data 155a, for example using or more machine learning model, to perform language identification. Such a component may determine if a particular language is being spoken based on the audio of content being output by a device, for example by processing the audio embedding data 155b with respect to data representing known languages. In another example, a content processing component 160d may correspond to a speaker identification component that is configured to process audio embedding data 155a, for example using or more machine learning model, to perform speaker identification. Such a component may identify who is speaking based on the audio of content being output by a device, for example by processing the audio embedding data 155b with respect to data representing known voices.

In another example, a content processing component 160f may correspond to an object recognition component that is configured to process image embedding data 155b, for example using or more machine learning model, to perform object recognition, for example by processing the image embedding data 155b with respect to data representing known objects. In another example, a content processing component 160g may correspond to a channel recognition component that is configured to process image embedding data 155b, for example using or more machine learning model, to perform channel recognition. Such a component may identify a source of the content, such as a particular video services, social media platform, or the like. In another example, a content processing component 160h may correspond to a landmark/scene recognition component that is configured to process image embedding data 155b, for example using or more machine learning model, to perform landmark/scene recognition. Such a component may identify a landmark or scene shown in the content. In another example, a content processing component 160i may correspond to a face recognition component that is configured to process image embedding data 155b, for example using or more machine learning model, to perform face recognition. Such a component may identify who appears in an image of the content, for example by processing the image embedding data 155b with respect to data representing known faces.

As can be appreciated, the above example processing component(s) 160 may rely exclusively on either audio embedding data 155a, image embedding data 155b, and/or some combination of both. Further, such example processing component(s) 160 may rely on other data such as metadata related to the multimedia content (if available), or other data which may be sent to the system component(s) 120, for example from user device 110, content source 20, or some other sender.

The downstream uses of the information determined by the example processing component(s) 160 may be varied. For example, if an object is recognized in the content, a system component may update its information to reflect the detection of the object so that if a user speaks command to a voice processing component of the system 100 such as "what is that" or "where can I purchase that", the system may have a record of the recognized object which it can use to respond to the user query. Further, if a user watches various content across multiple services (e.g., content sources 20), the system 100 may recognize the content displayed using device 110 across such services so the system 100 may offer a more holistic recommendation system (e.g., one with knowledge of content output from may different content sources 20) rather than a system that merely makes recommendations that is stratified content source by content source.

In some examples, the device 110 may generate the embedding data 155 as a series of embedding data vectors corresponding to segments of the decoded content data 134. To illustrate an example, the device 110 may generate the series of embedding data vectors using a first playback length (e.g., 4 seconds), although the disclosure is not limited thereto. For example, the device 110 may divide the decoded content data 134 into a plurality of segments (e.g., using continuous time windows, such that each segment corresponds to 4 seconds of the decoded content data 134) and generate the series of embedding data vectors, with each segment of the decoded content data 134 represented as a unique embedding data vector. However, the disclosure is not limited thereto and a length of the embedding data vectors may vary without departing from the disclosure. In some examples, the device 110 may divide the playback audio data 142 into a first plurality of segments using the first playback length (e.g., 4 seconds) and may divide the playback image data 144 into a second plurality of segments using a second playback length without departing from the disclosure. As described above, the system 100 may generate the query embedding data vectors audio data, image data, a combination of audio data and image data, and/or the like without departing from the disclosure.

As discussed above, in one example the system 100 may perform content processing using embedding data vectors to recognize known media content, for example using a particular content processing component 160. In such an example, an embedding data vector (either audio embedding data 155a and/or image embedding data 155b) may correspond to data representing certain features of content. Such embedding data vectors may be used to match unknown content (e.g., content output by a device) with known content (e.g., content tracked in a database or other data collection). The unknown content may be represented by embedding data 155 determined and output by the device 110 while the known content may be represented by reference data representing portions of the known content. Examples of embedding generation are discussed herein with respect to FIGS. 3-4C. Such content matching may be similar to matching performed using customized fingerprint data, but may be performed using generalized embedding data that is created using generalized embedding components described herein. For example, the system 100 may generate a reference database of known media content by generating reference embeddings for each media content item to include in the reference database. When the device 110 is playing media content, the system 100 may perform content recognition by generating a continuing series of embedding data vectors and comparing the embedding data vectors to reference embeddings included in the reference database and/or additional reference databases. For example, an individual embedding data vector may represent a short duration of the media content and the system 100 may match the embedding data vector to a reference embedding by identifying which of the reference embeddings shares the most frames/information with the embedding data vector and verifying that the number of frames exceeds a threshold, although the disclosure is not limited thereto.

While a single embedding data vector may match to multiple reference embeddings, the system 100 may use a continuing series of embedding data vectors to perform content verification and increase an accuracy of the content recognition output. For example, the system 100 may determine that multiple embedding data vectors match to the same media content item, increasing a likelihood that the media content item identified by performing content recognition actually corresponds to the media content output by the device 110.

While the system 100 may perform content processing to enable additional functionality, the system 100 may limit such content processing based on privacy controls associated with each user profile. For example, privacy preferences associated with an individual user profile may control types of media content on which the system 100 may perform content processing, the type and/or amount of data that can be used to perform content processing, which type of information should be anonymized and/or aggregated, and/or the like. Thus, the system 100 may provide additional functionality to user profiles that enable the additional functionality, while disabling the additional functionality to user profiles that have strict privacy settings or the like.

In addition, for content recognition purposes the system 100 may be limited in the specific media content that the system 100 can recognize as content recognition can only be performed for known media content, which was previously processed and stored in a reference database. For example, in order to perform content recognition, the system 100 must first generate a reference database including any reference embeddings with which the system 100 intends to match as part of identifying media content. Thus, the system 100 may be configured to perform content recognition using only specific media content that is owned by, licensed to, and/or made available to the system 100 by content providers. In some examples, the system 100 may include multiple reference databases, such that an individual reference database corresponds to a single content provider, in order to separate media content and/or reference embeddings associated with different content providers.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like. The various audio processing and/or image processing operations may be configured in various manners.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Figure 3:
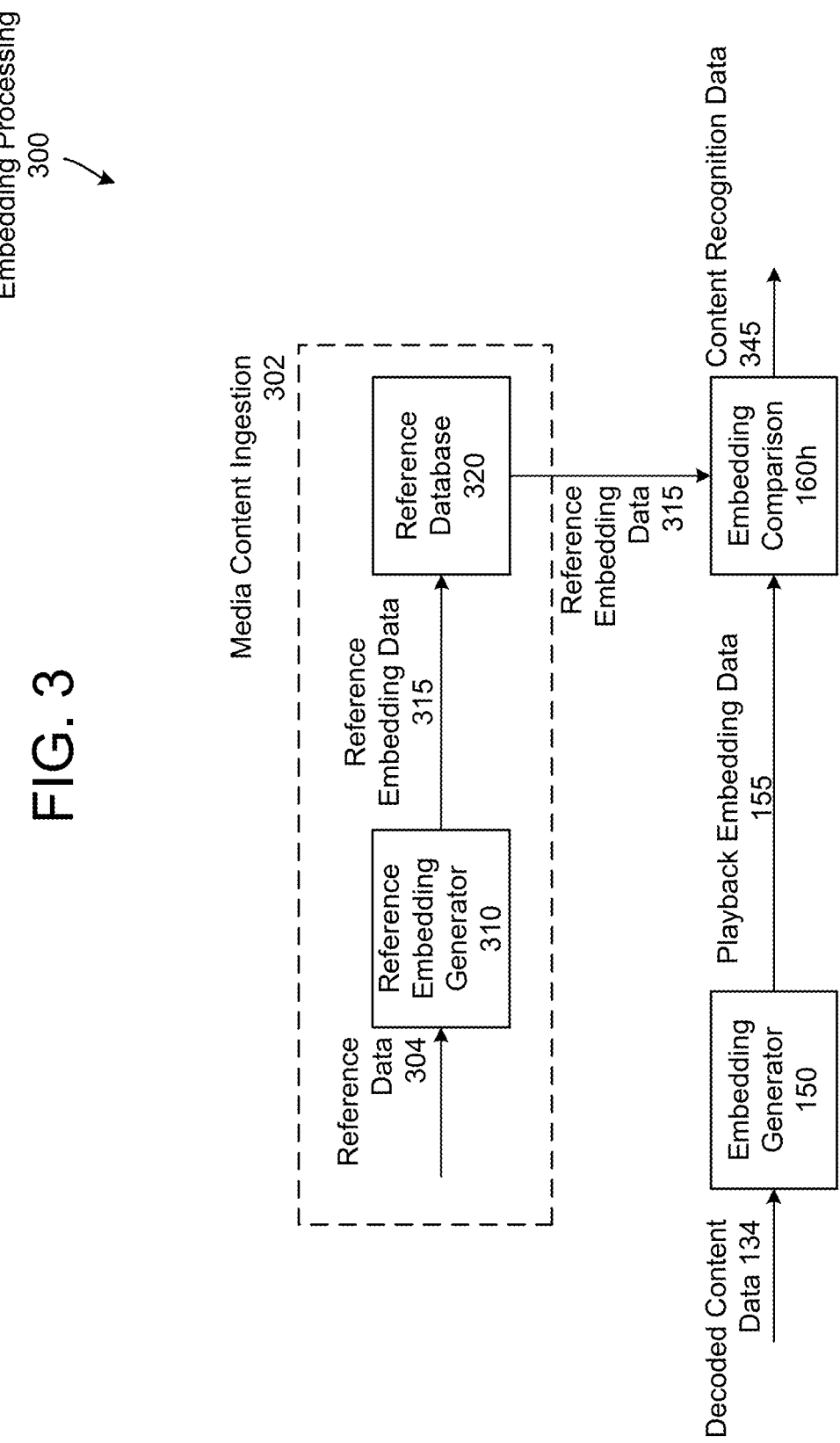
FIG. 3 illustrates an example component diagram for performing content recognition using embedding data according to embodiments of the present disclosure.

FIG. 3 illustrates an example component diagram for performing content recognition using embeddings according to embodiments of the present disclosure. Such operations may be performed, for example, by a content recognition component 160h. The descriptions of such operations are provided herein as an example of downstream operations that may be performed using embedding data 155. As described above, the system 100 may limit content recognition based on privacy controls associated with each user profile. For example, privacy preferences associated with an individual user profile may control types of media content on which the system 100 may perform content recognition, the type and/or amount of data that can be used to perform content recognition, which type of information should be anonymized and/or aggregated, and/or the like. Thus, the system 100 may provide additional functionality to user profiles that enable the additional functionality, while disabling the additional functionality to user profiles that have strict privacy settings or the like. To illustrate an example of additional functionality, the system 100 may perform content recognition to enable enhanced entity resolution, which allows the system 100 to interpret voice commands based on the specific media content being output to the user.

In addition, the system 100 may be limited in the specific media content that the system 100 can recognize as content recognition can only be performed for media content that was previously processed and stored in a reference database. For example, in order to perform content recognition, the system 100 must first generate the reference database including any reference embeddings with which the system 100 intends to match as part of identifying media content. Thus, the system 100 may be configured to perform content recognition using only specific media content that is owned by, licensed to, and/or made available to the system 100 by content providers. In some examples, the system 100 may include multiple reference databases, such that an individual reference database corresponds to a single content provider, in order to separate media content and/or reference embeddings associated with different content providers.

In the embedding processing 300 example illustrated in FIG. 3, media content ingestion 302 illustrates the process by which the system 100 may generate the reference database(s) 320. As illustrated in FIG. 3, an embedding generator component 310 may receive reference data 304 representing media content (e.g., a particular media content item such as a song, video, etc.) and the embedding generator component 310 may generate reference embedding data 315 that includes reference embeddings corresponding to the media content. The embedding generator component 310 may send the reference embedding data 315 to a reference database 320, which may be configured to store the reference embedding data 315 and/or information generated using the reference embedding data 315 without departing from the disclosure.

While the example described above refers to generating reference embedding data 315 for a single media content item, the disclosure is not limited thereto and the system 100 may perform media content ingestion 302 for a plurality of media content items without departing from the disclosure. For example, the reference database 320 illustrated in FIG. 3 may include reference embedding data 315 for hundreds or thousands of media content items without departing from the disclosure. Additionally or alternatively, the system 100 may include a plurality of reference databases 320 without departing from the disclosure.

The system 100 may perform media content ingestion 302 individually for each media content item (e.g., as the media content items are ingested), using batch processing (e.g., processing multiple media content items together), and/or the like without departing from the disclosure. Thus, in some examples the system 100 may perform media content ingestion 302 for a plurality of media content items during a period of time (e.g., initialization step), while in other examples the system 100 may perform media content ingestion 302 repeatedly over time, although the disclosure is not limited thereto.

In some examples, the media content processed during media content ingestion 302 may correspond to an audio clip and the reference embeddings may represent audio data associated with the audio clip. For example, the reference data 304 may correspond to the audio data (e.g., representing audio signals, audio waveforms, and/or the like), and the reference embedding data 315 may correspond to reference embeddings that represent audio features representing the audio data. In other examples, the media content processed during media content ingestion 302 may correspond to a video clip and the reference embeddings may represent audio data associated with the video clip. For example, the reference data 304 may correspond to audio data included in the video clip, and the reference embedding data 315 may correspond to reference embeddings that represent audio features representing the audio data.

While the above description illustrates examples in which the reference embeddings are generated using audio data, the disclosure is not limited thereto. Instead, the reference embeddings may correspond to any type of data structure and/or may represent any type of data without departing from the disclosure. Thus, in some examples the reference embeddings may represent image data without departing from the disclosure. To illustrate an example, the media content processed during media content ingestion 302 may correspond to a video clip and the reference embeddings may represent image data associated with the video clip. For example, the reference data 304 may correspond to image data included in the video clip, and the reference embeddings data 315 may correspond to reference embeddings that include image features representing the image data, although the disclosure is not limited thereto.

Additionally or alternatively, the reference data 304 may correspond to both image data and audio data without departing from the disclosure. For example, the reference data 304 may include image data and audio data associated with the video clip, and the reference embedding data 315 may represent each segment of the reference data 304 using either (i) a first reference embedding that includes image features representing the image data along with audio features representing the audio data, or (ii) a second reference embedding that includes image features representing the image data along with a third reference embedding that includes audio features representing the audio data.

While the examples described above refer to the reference embedding data 315 representing audio data and/or image data, the disclosure is not limited thereto and the reference embedding data 315 may correspond to any type of data without departing from the disclosure. Additionally or alternatively, while the examples described herein may refer to generating a reference embedding, the disclosure is not limited thereto and the system 100 may generate any type of data structure without departing from the disclosure. For example, the system 100 may generate any reference data that summarizes and/or represents characteristic components of input data without departing from the disclosure. Thus, the system 100 may map an arbitrarily large data item to a much shorter representation, which uniquely identifies the original data.

In some examples, the embedding may represent feature vector data may be two-dimensional vectors and may include information such as energy values in individual frequency ranges without departing from the disclosure. However, the disclosure is not limited thereto and the feature vector data may include any features or characteristics of the audio data without departing from the disclosure. For example, the audio embedding may take into account perceptual characteristics of the audio, such that a first audio embedding associated with a first audio sample may match a second audio embedding associated with a second audio sample if the first audio sample and the second audio sample sound similar to the human ear. Thus, the feature vector data may include perceptual characteristics or features without departing from the disclosure, and examples of perceptual characteristics may include zero crossing rate, estimated tempo, average spectrum, spectral flatness, prominent tones across a set of frequency bands, bandwidth, and/or the like.

Figure 4A:
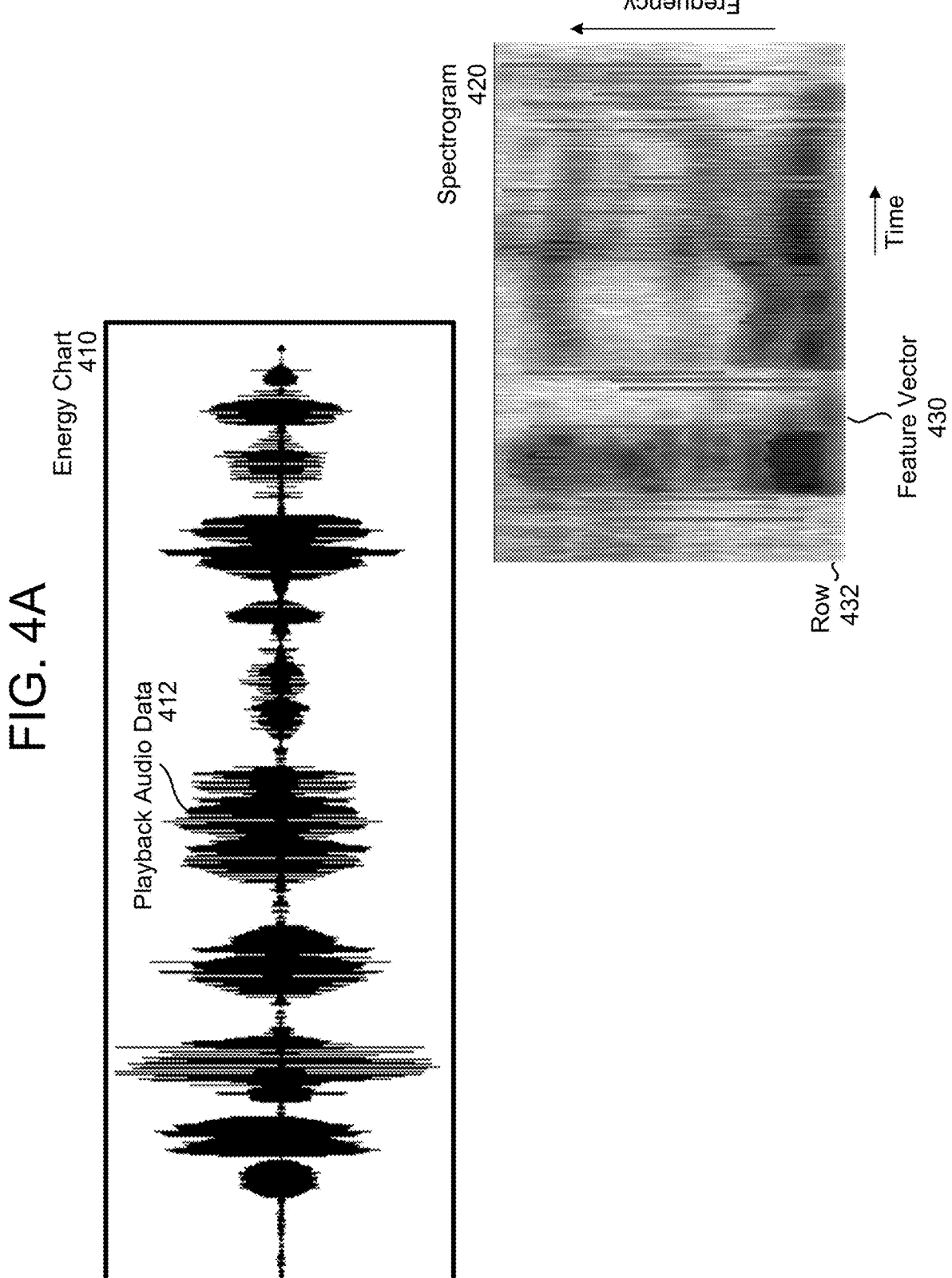
FIGS. 4A-4C illustrate examples of embedding data generation according to embodiments of the present disclosure.
Figures 4B, 4C:
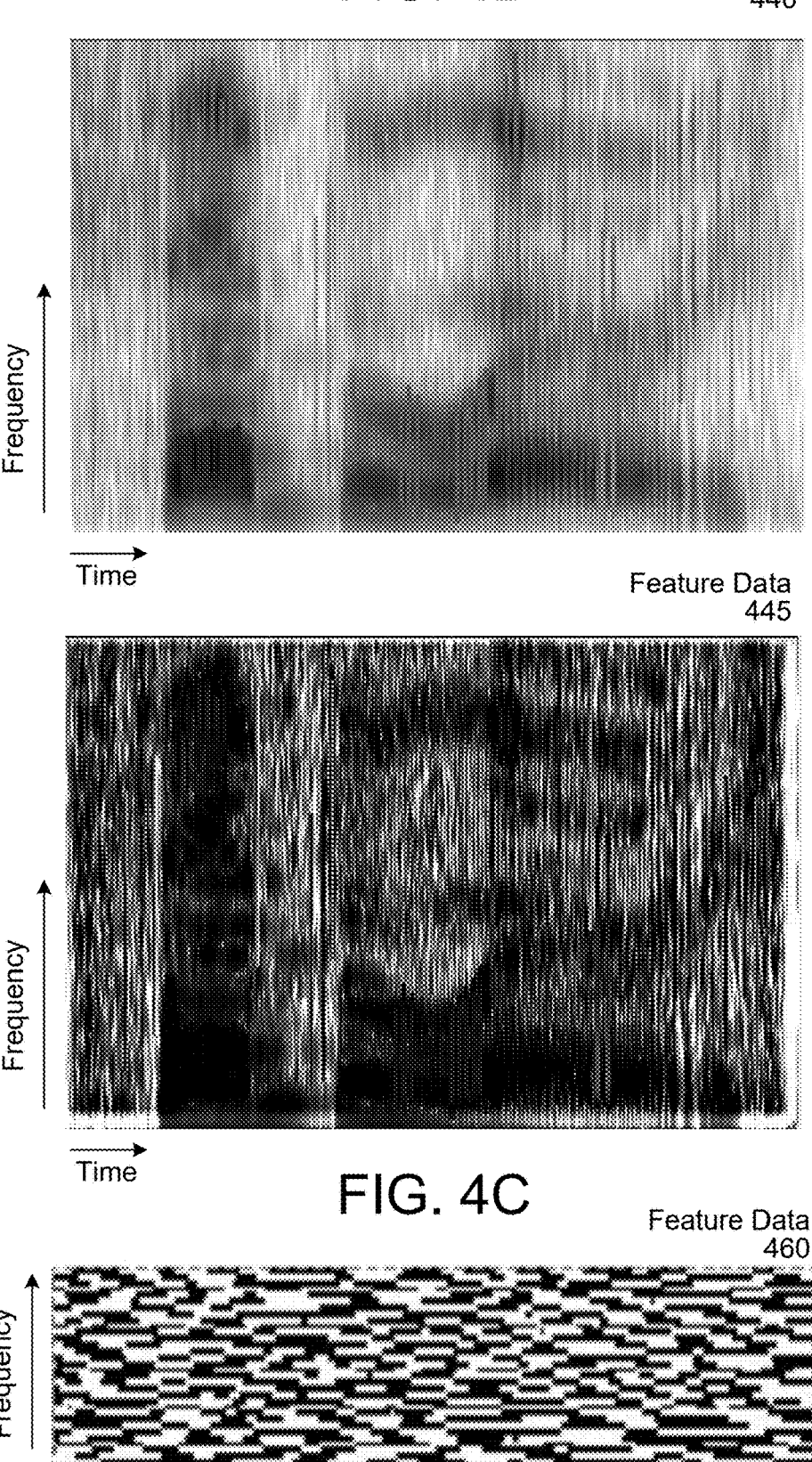

FIGS. 4A-4B illustrate examples of determining embedding data according to embodiments of the present disclosure. As illustrated in FIG. 4A, an example of playback audio data 412 representing speech is shown as energy chart 410. In some examples, the system 100 may create a time-frequency graph using the playback audio data 412, such as spectrogram 420. For example, the system 100 may generate the spectrogram 420 by splitting the playback audio data 412 into segments over time and plotting the result as a graph that plots the audio using three dimensions: frequency, amplitude, and time. For example, spectrogram 420 represents frequency (e.g., frequency ranges or subbands) along a vertical axis, time (e.g., audio frames) along a horizontal axis, and amplitude (e.g., intensity values) as a color ranging from black (e.g., low intensity value) to white (e.g., high intensity value).

As illustrated in the spectrogram 420, an audio signal may be represented as individual audio frames (e.g., feature vectors corresponding to a time window). For example, a feature vector 430 may be a vertical representation of an individual audio frame that may include a number of harmonics (e.g., horizontal lines in the spectrogram 420). A particular row 432 in a sequence of feature vectors (e.g., element k in each feature vector) may be associated with the same frequency/pitch/harmonic of the audio signal at different points in time.

In some examples, the system 100 may generate an audio embedding by determining feature vector data similar to the spectrogram 420 illustrated in FIG. 4A. For example, the feature vector data may represent frequency content (e.g., spectral characteristics) of an individual segment of the reference data 304, which may correspond to a signature or other identification that can be used to match similar audio segments. However, the disclosure is not limited thereto, and in other examples the system 100 may generate an audio embedding by determining feature vector data and then encoding relevant features of the audio content from the feature vector data.

To illustrate an example of this distinction, FIG. 4B depicts a spectrogram 440, which is a visual representation of frequency content included in a portion of audio data, such as an individual segment of the reference data 304. As illustrated in FIG. 4B, the brighter the intensity values represented in the spectrogram 440, the more acoustic information is present in corresponding frequency ranges of the reference data 304. Thus, in some examples the system 100 may generate feature data 445 by ignoring the noise present in other frequency ranges and focusing on these frequency peaks, which contain the most relevant information for this individual segment of the reference data 304. However, the disclosure is not limited thereto and the system 100 may generate the audio feature data using other techniques without departing from the disclosure.

To illustrate another example, in some examples the system 100 may generate an embedding based on secondary features calculated using the feature vector data, such as changes in intensity values between audio frames, sign of energy differences, and/or the like. For example, FIG. 4C illustrates an example of feature data 460, which the system 100 may generate by determining a 32-bit feature value for every frame. In order to extract a 32-bit feature value for every frame, the system 100 may select 33 non-overlapping frequency bands, which may be included within a desired frequency range (e.g., 300 Hz to 2 kHz, although the disclosure is not limited thereto). In the feature data 460 example illustrated in FIG. 4C, the system 100 may determine a sign of energy differences (simultaneously along the time and frequency axes), as shown below:

$$F(n, m) = \qquad\qquad\qquad\qquad\qquad [1]$$
$$\begin{cases} 1 \text{ if } E(n, m) - E(n, m+1) - E(n-1, m) - E(n-1, m+1) > 0 \\ 0 \text{ if } E(n, m) - E(n, m+1) - E(n-1, m) - E(n-1, m+1) \le 0 \end{cases}$$

where E(n,m) denotes the energy of band m of frame n, and F(n,m) denotes the feature value for the m-th bit of frame n. As illustrated in FIG. 4C, the system 100 may use Equation [1] to generate the feature data 460 by extracting 256 subsequent 32-bit values from an excerpt of audio data, with a first logic value (e.g., '0') represented by a black pixel and a second logic value (e.g., '1') represented by a white pixel. However, the disclosure is not limited thereto, and the system 100 may generate the feature data using other techniques without departing from the disclosure. The system may then encode feature data 445 and/or feature data 460 to determine an embedding representation of the underlying audio data.

Referring back to FIG. 3, the reference database 320 may receive reference embedding data 315 corresponding to each media content item with which the system 100 may perform content recognition.

Referring back to FIG. 3, as described above the system 100 must perform media content ingestion 302 prior to performing content recognition. Thus, the system 100 may perform media content ingestion 302 as an initialization step for the reference database 320, while the reference database 320 is offline (e.g., disabling the reference database 320 in order to perform media content ingestion 302 to add reference embeddings to the reference database 320), while the reference database 320 is online (e.g., performing media content ingestion 302 for individual media content items during run-time), and/or the like without departing from the disclosure. In some examples, the reference database 320 may be associated with a plurality of households and/or businesses and only accessible via extended networks, although the disclosure is not limited thereto.

To perform content recognition, an on-device data generator component, such as embedding generator 150 may receive decoded content data 134 and may generate playback embedding data 155 using the techniques described above with regard to the embedding generator component 310. The decoded content data 134 may correspond to audio data, image data, video data, and/or the like that is being output by the device 110 to the user. For example, the decoded content data 134 may be received from a playback path (e.g., a path from a media interface component 140 to an output component such as loudspeaker 112, display 114, or the like) configured to generate output audio using loudspeaker(s) associated with the device 110, to display image data on a display associated with the device 110, and/or the like.

To illustrate a simple example, the decoded content data 134 may correspond to audio data and the embedding generator component 150 may receive the decoded content data 134 from a playback audio path of the device 110 that is configured to generate playback audio (e.g., output audio) using one or more loudspeaker(s) associated with the device 110. In some examples, the device 110 may receive the audio data via the network(s) 199 while playing media content (e.g., music, audio clip, video clip, television show, movie, etc.). For example, the device 110 may receive the audio data from a content database, remote device, remote system, and/or the like that is not connected to a local area network (LAN) associated with the user profile. However, the disclosure is not limited thereto, and in other examples the device 110 may receive the audio data from a local device connected to the LAN without departing from the disclosure, such as a home server, a media content storage device, a device configured to play media content stored on physical disks, and/or the like. Additionally or alternatively, the device 110 may receive the audio data via the network(s) 199 while participating in a communication session without departing from the disclosure.

In certain embodiments, and depending on the training of the embedding generator 150 and the format of the playback embedding data 155, the playback embedding data may be used to compare against reference embedding data 315 to determine if the output content is recognized. For example, as illustrated in FIG. 3, the embedding generator component 150 may generate the playback embedding data 155 representing one or more data vectors and may send the playback embedding data 155 to an embedding comparison component 160h. In some examples, the embedding generator component 150 may be included in the device 110 while the embedding comparison component 160h may be included in the system 100, although the disclosure is not limited thereto. In other examples, however, the embedding generator component 150 and the embedding comparison component 160h may be included in the device 110 without departing from the disclosure.

As described in greater detail above with regard to the reference embedding data 315, the system 100 may generate embeddings using audio data, image data, a combination of audio data and image data, and/or the like without departing from the disclosure. Thus, the embedding generator component 150 may generate playback embedding data 155 that includes data that may be used to compare against embeddings representing audio data, image data, a combination of audio data and image data, and/or the like without departing from the disclosure. In some examples, the device 110 may determine the type of data represented by the playback embedding data 155 and may route and/or process the playback embedding data 155 accordingly. For example, the device 110 may send audio embedding data 155a representing audio data to a first embedding comparison component 160h-1 while sending image embedding data 155b representing image data to a second embedding comparison component 160h-2, although the disclosure is not limited thereto.

The embedding comparison component 160h may receive the reference embedding from the reference database 320 and the playback embedding data 155 from the embedding generator component 150 and may perform content recognition to determine content recognition data 345 corresponding to the decoded content data 134. For example, the playback embedding data 155 may include data representing a plurality of frames and the embedding comparison component 160h may generate content recognition data 345 indicating identification data (e.g., content identification) for a media content item associated with the decoded content data 134. Thus, in some examples the content recognition data 345 may identify a single media content item being output by the device 110, although the disclosure is not limited thereto. The embedding comparison component 160h may attempt to match the reference embedding data 315 to playback embedding data 155 using a fuzzy comparison to determine if the embeddings are within a certain value/distance of each other within the embedding space.

In some examples, the embedding comparison component 160h may generate content recognition data 345 indicating a single media content item corresponding to the decoded content data 134. For example, the embedding comparison component 160h may determine the media content item having a highest frequency of occurrence within the plurality of frames included in the query embedding. However, the disclosure is not limited thereto, and in other examples a number of media content items included in the content recognition data 345 may vary without departing from the disclosure. For example, the embedding comparison component 160h may generate the content recognition data 345 to indicate an n-best list (e.g., top 3 media content items), a variable number of media content items having a frequency above a threshold value, and/or the like without departing from the disclosure.

When playback embedding data 155 is sent from a device 110 to one or more other component(s), the device 110 may also send metadata corresponding to the embedding data. Thus embedding data 155 sent by a device 110 may include the actual embedding data vector(s) as well as the metadata. Such metadata may correspond to information about the device 110, information about the content that was embedded (to the extent such information was available to the device 110), information about the embedding data 155, or other information that may be used in embedding processing.

Such metadata may include information about the device 110. For example, the metadata may include an identifier of the device 110, such as a device ID, serial number, or the like. The metadata may also include an indicator of a device-type, for example a device model number or indicator of what hardware component(s) (display, loudspeaker, etc.) are available to the device. The metadata may also include an indicator of which output component the media content was being played back by (such as a display, loudspeaker, etc.). The metadata may also include an identifier of a user profile associated with a device. The metadata may also include information about the device's location, time zone, etc. The metadata may also include information about what decoding technique was used by the device to determine the decoded content data 134 corresponding to the embedding.

The metadata may also include information about the content that was embedded. For example, the metadata may include an identifier corresponding to the content source 20 that provided the content. The metadata may include time information related to when the content 22 was received by and/or output by the device 110. The metadata may include information about a signal/service quality associated with the content such as a bit error rate (BER), or other metric. The metadata may include information related to copyright information corresponding to the first content.

The metadata may also include information about the embedding data 155 itself. For example, the metadata may include an identifier (e.g., unique identifier) corresponding to the embedding data. The metadata may also include information about the particular metadata algorithm/version used to create the embedding data. The metadata may include information about the particular hardware component(s) used to create the embedding data. The metadata may include information identifying the type of embedding (e.g., audio embedding data, image embedding data, mixed embedding data, etc.). The metadata may include information indicating potential errors/error codes that were associated with the embedding operation. The metadata may include time data related to the embedding. Such time data may include information the length of output content represented by the particular embedding (e.g., 4 seconds of content, 1 minute of content, etc.), information about a playback start time and/or a playback end time for the particular content represented by the embedding, information about the playback window, and/or other time data. The metadata may also include information linking one embedding vector to another (for example, indicating their relative position in a sequence, or the like).

Metadata may be sent from a device 110 to other components as part of embedding data 155. In one example, embedding data and its associated metadata may be sent one at a time. In another example, embeddings and metadata may be batched together.

In another example, the system 100 may determine, using metadata, that a particular ID is associated with the particular embedding.

Various actions may be taken following recognition of a particular content item using embedding data. The system 100 may store data indicating the recognition and may send that data to various sources such as a device associated with a user profile, content source, etc.

As noted above, content recognition is one example of downstream operations that may be performed on embedding data. Many such downstream operations may be performed. For example, if the system 100 is able to determine what content is actually being output by a device 110 (as opposed to what content is requested from a particular content source 20), the system 100 may be able to make content recommendations that are based on actual content output. Further, operations such as facial recognition, channel recognition, acoustic event detection, emotion classification, and others may all depend in one form or another on content being output by a device 110. It is not practical, however, to have a potentially resource constraint device 110 operate multiple data capture components, each output customized data for operations by each of these downstream processing components (e.g., content processing components 160). It is therefore desirable to have a limited number of data capture components (e.g., an audio embedding generator 150*a* and an image embedding generator 150*b*) processing output content for downstream operations.

To improve the performance of the overall system 100 and the device 110, it is desirable for the on-device data capture component (e.g., embedding generator 150) to meet certain criteria. First, the on-device data capture component(s) should be small enough, and require a modest amount of computing resources, to be operated by a device 110 of various (and potentially limited) configurations, including I/O limited devices 110*c*, etc. Second, in certain embodiments the data output by such a component (e.g., embedding data 155) is configured so that reconstruction of the original signal is difficult, if not impossible. Thus, in certain embodiments the playback audio data 142 may not be reconstructable using audio embedding data 155*a*. Similarly, in certain embodiments the playback image data 144 may not be reconstructable using image embedding data 155*b*. Third, in certain embodiments the data capture component (e.g., embedding generator 150) is configured to capture, and include in its output data (e.g., embedding data 155), sufficient information for use by multiple known downstream components that may perform a variety of operations (e.g., content processing components 160*a*-160*i*). Fourth, in certain embodiments the data capture component (e.g., embedding generator 150) is configured to capture, and include in its output data (e.g., embedding data 155), sufficient information that can be used by an as-of-yet unknown downstream component (e.g., a future content processing component 160*x*). As the system 100 may be unaware exactly what specific information related to the output content such an unknown component may use in the future, in certain embodiments each data capture component (e.g., embedding generator 150) is trained to be sufficiently robust so that it captures significant information from the raw data (e.g., the playback audio data 142, playback image data 144 and/or other data) to allow future components to use the resulting embedding data 155 without the system 100 retraining the specific embedding generator(s) 150, which would then involve sending the retrained embedding generator(s) 150 to many different devices 110.

Thus, in order to render the resulting embedding data 155 as useful as possible for not-yet-determined downstream processing components, the on-device data capture component(s) (e.g., embedding generator 150) should be generalizable to tasks that were not used in training. Namely, it should capture information in a multimedia signal (e.g., multimedia content data 134) that may potentially be useful for a future trained task. To configure the embedding generator(s) 150 in such a manner only a subset of known tasks are used to train the respective embedding generators 150. Other known tasks not within the subset may be held-out for purposes of evaluating the trained embedding generators 150 in determining whether they generate embedding data 155 sufficient to perform the held-out tasks.

Training the embedding generator(s) 150 may be performed as illustrated in FIG. 1A. As shown, a number of content processing component(s) 160 may be jointly trained with the embedding generator(s) 150 using a multitask objective function 185. As shown, however, only certain content processing component(s) 160 may be included in the training. Those may be referred to as the included content processing/training tasks 163. Such included content processing/training tasks 163 in FIG. 1A include content processing components 160*a*, 160*b*, 160*c*, 160*f*, 160*g*, and 160*h*. Other content processing component(s) 160 may be deliberately excluded from the training process. Such content processing component(s) are illustrated as the held-out training tasks 161. Such held-out training tasks 161 in FIG. 1A include content processing components 160*d* and 160*i*. In this manner the operations of the included content processing/training tasks 163 may be considered while training the embedding generator(s) 150 while the operations of the held-out training tasks 161 may not be considered while jointly training the embedding generator(s) 150/included content processing components 163.

The training of the embedding generator(s) 150/included content processing components 163 may be performed using a multi-task loss 187 derived by the multitask objection function 185 from multimedia signals 134 with metadata 183 (which may correspond to ground truth information corresponding to one or more content processing component(s) 160).

For example, as one of the particular included content processing components 163 is processing embedding data related to the content data 134 and making a prediction as to the particular operation of the content processing component (for example, for a language detection component, detecting what language is being spoken in the content data 134), the training (e.g., using the multitask objection function 185) may compare the prediction during training to the ground truth (e.g., as represented by metadata 183) to determine one or more values for a loss function which may represent how far the prediction is from the ground truth. The training will determine a multi-task loss 187 to adjusts the parameters of the particular content processing component to reduce that value (e.g., minimize the loss) in further iterations. The multi-task loss 187 may also consider other parameter adjustment data related to other of the content processing components in the included content processing components 163 (which may be determined in a similar manner). The individual losses for the different content processing components may be considered in a number of ways, for example a complex combination (e.g., weighted sum) of the losses to be minimized may be used to determine the multi-task loss 187. The multi-task loss 187 may also optimize to account for those losses separately. Other known joint training operations may be performed.

The training may also involve using an unsupervised similarity preserving loss for both content signals with and without metadata. Such an unsupervised similarity preserving loss may help configured the embedding generator(s) 150 to preserve certain low level signal information in the resulting high level embeddings 155 while simultaneously regularizing the embedding generator(s) 150 to avoid overfitting to the included content processing/training tasks 163. Such a similarity preserving loss may consider data representing perceptual similarity of content data 134 with respect to certain content processing operations.

The resulting multi-task loss 187 (shown being passed through to included content processing components 163 and embedding generators 150*a* and 150*b*) may be used to adjust the models being trained (e.g., the embedding generator(s) 150/included content processing components 163) to adjust the information generated by the respective generator(s) during embedding of the multimedia content data 134 to determine the embedding data 155 as well as the results determined by the individual content processing components 160 included in the included content processing components 163. Thus, during training, one or more of the loss functions may result in adjusted model weights and the system 100 may perform back propagation of errors (and/or other techniques) to adjust the configuration/model weights/other parameters, etc. of the embedding generator(s) 150, thus adjusting what embedding data 155 is produced by the respective embedding generator 150 in response to the input multimedia content data. During training the resulting embedding data 155 is processed by the included content processing/training tasks 163 whose output is fed into the multitask objective function 185, which evaluates the performance of that output (e.g., with respect to the metadata 183) and may adjust the configuration/model weights/other parameters, etc. according to the loss function, which may then be again used to adjust the embedding generator(s) 150 and/or the included content processing components 163 as part of the training process.

In one embodiment the embedding generator(s) 150 may be trained during a concurrent training process, meaning audio embedding generator 150*a* may be trained at the same time as image embedding generator 150*b* based on training operations involving the included content processing/training tasks 163. In another embodiment the audio embedding generator 150*a* may be trained in a separate process where only content processing components that process audio data (e.g., content processing components 160*a*, 160*b*, and 160*c*) impact the training of audio embedding generator 150*a* while the image embedding generator 150*b* may be trained in its own separate process where only content processing components that process image data (e.g., content processing components 160*f*, 160*g*, and 160*h*) impact the training of image embedding generator 150*b*.

Figure 5:
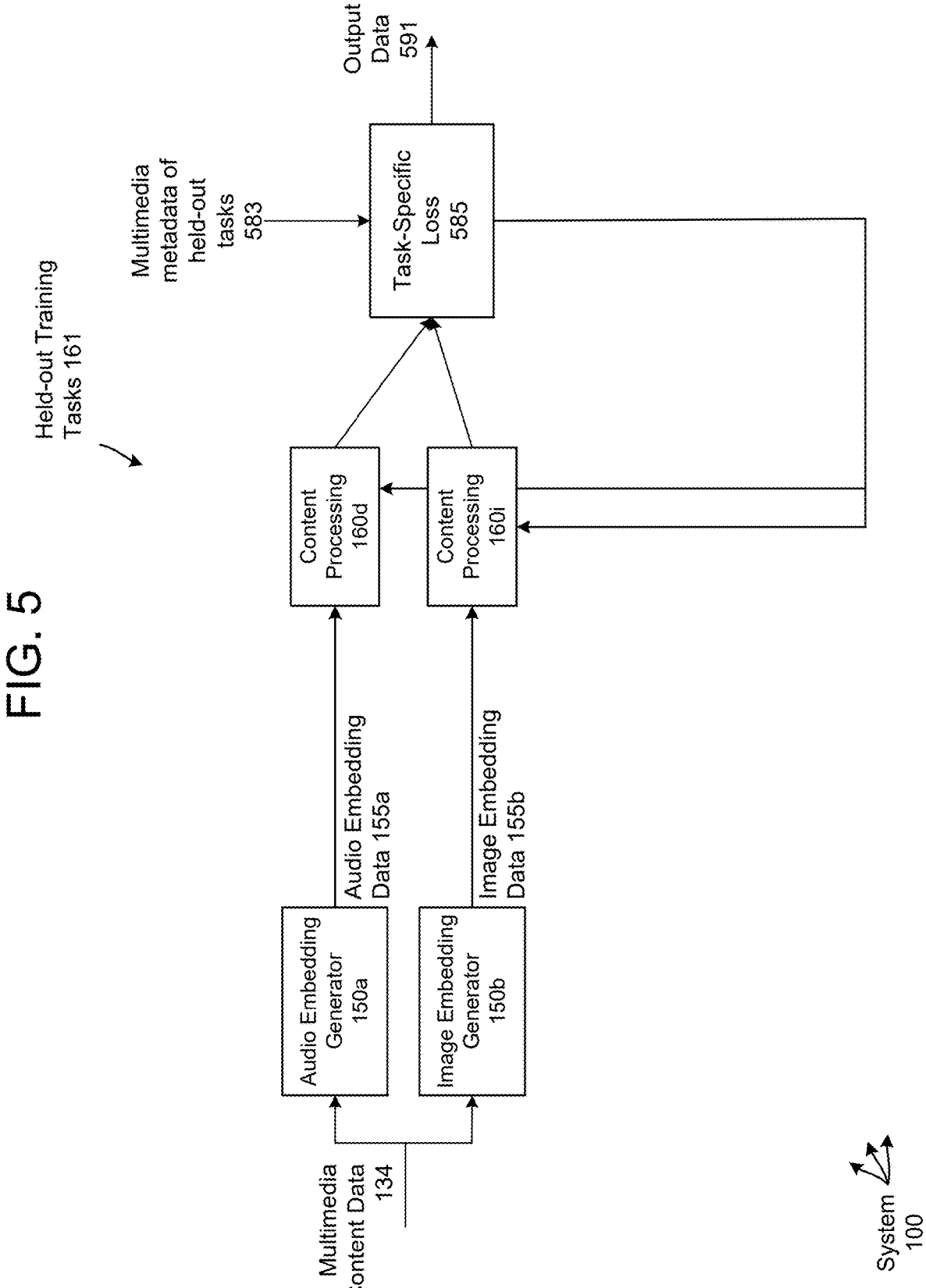
FIG. 5 illustrates a system configured to train embedding generation component(s) according to embodiments of the present disclosure.

In this manner the embedding generator(s) 150 may be trained/configured to reduce the error on the included content processing/training tasks 163. Once the embedding generator(s) 150 as trained in this manner, their performance may be tested with regard to the held-out training tasks 161. Such operations are shown in FIG. 5. As shown, the embedding generator(s) 150 may process multimedia content data 134 and send the resulting embedding data to the held-out training tasks 161. Thus, the audio embedding generator 150*a* may send audio embedding data 155*a* to held-out content processing component 160*d* and the image embedding generator 150*b* may send image embedding data 155*b* to held-out content processing component 160*i*. The resulting output of those processing components may be sent to the task-specific loss component 585 which may process the resulting output with respect to the multimedia metadata (e.g., ground truth data) for the held-out tasks 583. The resulting output data 591 may be used to assess the performance of the embedding data 155 generated by the embedding generator(s) 150 (as trained with respect to the included content processing/training tasks 163) on the held-out training tasks 161. During the operations illustrated in FIG. 5, the configuration/model weights/other parameters, etc. of the embedding generator(s) 150 are not changed. However the task-specific loss 585 (which measures how well the content processing components of the held-out training tasks 161 perform using the embedding data as compared to the ground-truth/metadata 583) may be used to train the held-out training tasks 161 (e.g., content processing components 160*d* and 160*i*) and thus update their configuration/model weights/other parameters. Such training may continue through several iterations to determine if there are configuration/model weights/other parameters achievable that will result in desired operation of the held-out training tasks 161 using embedding data from the configured embedding generators 150*a*/150*b*. In this way, the system 100 may evaluate the performance of the embedding generator(s) 150 with regard to the held-out training tasks 161.

The system 100 thus evaluates the output data 591 to determine the performance of the embedding generator(s)

150 with regard to the held-out training tasks 161 (e.g., whether use of the resulting embedding data by the held out content processing component(s) can be sufficiently trained so the output data 591 sufficiently matches the ground-truth/metadata 583). If the output data 591 indicates that the embedding generator(s) 150 do not perform well with regard to the held-out training tasks 161 meaning the embedding data 155 generated by that version of the embedding generator(s) 150 are insufficient for proper performance of the held-out training tasks 161, the training processes of FIG. 1A may be performed again. To improve the performance of later training iterations the system may employ different regularization tasks to perform new training processes of FIG. 1A so the resulting embedding generator(s) 150 perform better with regard to the held out training tasks 161 as discussed in FIG. 5. For such an updated training iteration, the multi-task loss 187 and/or unsupervised similarity preserving loss may be adjusted/augmented to adjust the embedding generator(s) 150 to capture additional/different information from input multimedia content data 134.

Adjusted training may involve a number of different processes. In one example, the system 100 may penalize network parameters that are used in a task which is related to (but not the same as) a held-out training task 161. For example, adjusting parameters for an object recognition task when a scene classification task is held-out. In another example, the system 100 may employ masking techniques to mask data that would otherwise be used by an included content processing/training task 163 (e.g., masking an object) in order to configure, as part of the training, an embedding generator(s) 150 to capture further data.

FIG. 6 illustrates techniques for training embedding generation component(s) according to embodiments of the present disclosure. As shown in FIG. 6, the system 100 may determine (602) a plurality of components configured to perform respective tasks on embedded media data. For example, the plurality of components may include the included content processing/training tasks 163 as described above. The system 100 may determine (604) a preliminary embedding component configured to process media data to determine embedded media data. Such a preliminary embedding component may include a to-be-trained version of the audio embedding generator 150a and/or a to-be trained version of the image embedding generator 150b. The preliminary embedding component may be configured with first parameter data (e.g., first weights, neural network layers, or other machine learning parameter data corresponding to the preliminary still-to-be trained nature of the preliminary embedding component. The first parameter data may, for example, be some preliminary initialized model weights/data or may be some partially trained model weights/data as the result of some early training iterations.

The system may determine (606) training media data, which may include training multimedia content data 134 and potentially corresponding metadata 183/ground truth data to be used during training. The training media data may correspond to audio data (for example for training audio embedding generator 150a). The training media data may correspond to image data (for example for training the image embedding generator 150b). The system 100 may train the model using an iteration of training steps. As shown in FIG. 6, the system 100 may process (608) a portion of the training media data using the preliminary embedding component to determine training embedding media data. The system may then process the training embedding media data using a first component to determine first training classification data (610) and using a second component to determine second training classification data (612). For example, the system may process preliminary audio embedding data 155a using content processing components 160a and 160b. In another example, the system may process preliminary image embedding data 155b using content processing components 160f and 160g.

The system 100 may then process (614) the first training classification data and the second training classification data (and potentially other training classification data), for example using the multitask objective function 185, multimedia metadata 183, etc. to determine training loss data, for example the multi-task loss 187. The system 100 may then adjust the preliminary embedding component (616) using the training loss data. This may result in a revised preliminary embedding component with new parameter data (e.g., adjusted model weights or the like). The system 100 may iteratively perform training, for example by repeating steps 608-616 until the embedding component is fully trained, e.g., an adjusted preliminary embedding component corresponding to second parameter data is determined. The system 100 may then send (618) the adjusted embedding component to one or more user devices 110 for purposes of runtime processing of media content to determine embedding data.

To determine that the embedding component is fully trained, the system 100 may, as described in reference to FIG. 5, process some further training media data using the adjusted embedding component to determine second training embedding media data. The system 100 may then process the second training embedding media data using one of the held-out training tasks 161 to determine third training classification data. For example, the system may process some training audio embedding data 155a using content processing component 160d. In another example, the system may process training image embedding data 155b using content processing components 160i. The system may process the results of the content processing components to determine some output data. For example, a task-specific loss component 585 may process the results with respect to some multimedia 583/ground truth data to determine if the second training embedding media data was processed successfully by the held-out component(s). If so, and the results sufficiently corresponded to the ground-truth data, the system 100 may determine the adjusted embedding component was fully trained and may send it (618) to user device(s) 110.

FIG. 7 illustrates techniques for operating embedding generation component(s) at runtime/inference according to embodiments of the present disclosure. A device 110 may receive (702) an adjusted (e.g., fully trained) embedding component. The device 110 may process (704) media data using the adjusted embedding component to determine first embedding data and may send (706) the first embedding data for downstream processing. A downstream component, such as system component(s) 120, which may include one or more processing component(s) 160, may receive (708) the first embedding data, process (710) it using a runtime processing component 160 which may determine (712) some output data. The system 100 may then perform (714) an action based on that output data. In one example, the runtime processing component may correspond to one of the included content processing/training tasks 163. In another example, the runtime processing component may correspond to one of the held-out training tasks 161. In another example, the runtime processing component may correspond to a processing component that was neither one of the included content processing/training tasks 163 nor one of the held-out training tasks 161. In certain examples, the runtime processing task may correspond to a component that was configured after the adjusted (e.g., final) embedding component was configured and distributed to the user device 110.

Once embedding generator(s) 150 are configured as described herein, they may then be deployed to many different devices 110 for operation at runtime/inference. The resulting embedding data 155 created by the device(s) 110 operating the embedding generator(s) 150 may then be sent to downstream components (such as those located with system 120) for processing using whatever content processing component(s) 160 are appropriate for the task. Further, if a new content processing component 160*x* is configured after deployment of the embedding generator(s) 150, it still should be able to operate using the embedding data 155 given the flexible nature of the training of the embedding generator(s) 150 and the inclusive nature of the information reflected in the embedding data 155. Further, if one or more content processing component(s) 160 are to be retrained for whatever purposes (reconfiguration, realignment, fixes, etc.), they may be retrained as needed without impacting the embedding generator(s) 150 already deployed on multiple devices 110.

Figure 9:
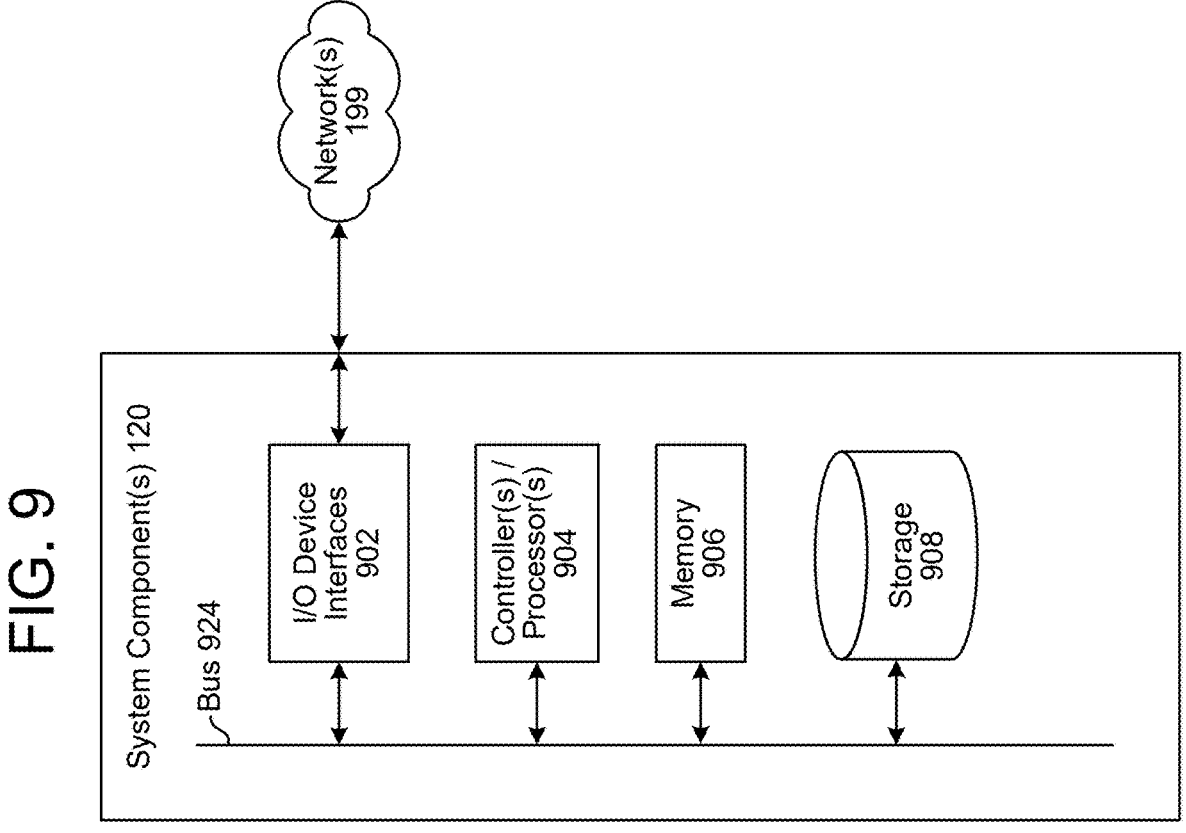
FIG. 9 is a block diagram conceptually illustrating example components of a system, according to embodiments of the present disclosure.

FIG. 8 is a block diagram conceptually illustrating a device 110 that may be used with the system. FIG. 9 is a block diagram conceptually illustrating example components of one or more system component(s) 120. In some examples, the one or more system component(s) 120 may include a natural language command processing subsystem, which may assist with ASR processing, NLU processing, etc. In addition, the one or more system component(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the one or more system component(s) 120 may be located remotely from the device 110 as its operations may not require proximity to the user. The system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the system component(s) 120 being in a user's home/business is that data used to process a command/return a response may be kept within the user's home, thus reducing potential privacy concerns.

Multiple system component(s) 120 may be included in the overall system 100 of the present disclosure. For example, the system component(s) 120 may correspond to one or more natural language processing subsystems for performing ASR processing, one or more natural language processing subsystems for performing NLU processing, and/or the like. In operation, each of these subsystems may include computer-readable and computer-executable instructions that reside on the respective system component(s) 120, as will be discussed further below.

Each of these devices (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as one or more loudspeaker(s) 112, a wired headset or a wireless headset (not illustrated), or other component capable of outputting audio. The device 110 may also include an audio capture component. The audio capture component may be, for example, one or more microphone(s) 213 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 114 for displaying content. The device 110 may further include a camera 215.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) (110/120) may include their own dedicated processors, memory, and/or storage. Alternatively, one or more of the components of the device(s) (110/120) may utilize the I/O interfaces (802/902), processor(s) (804/904), memory (806/906), and/or storage (808/908) of the device(s) (110/120). Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) (110/120), as described herein, are illustrative, and may be located as a stand-alone device or may be included, in whole or in part, as a component of a larger device or subsystem. As can be appreciated, a number of components may exist either on the device 110 and/or the system component(s) 120. Unless expressly noted otherwise, the system component(s) 120 version of such components may operate similarly to the user device 110 version of such components and thus the description of one version (e.g., the system component(s) 120 or the user device 110) applies to the description of the other version (e.g., the user device 110 or the system component(s) 120) and vice-versa.

Figure 10:
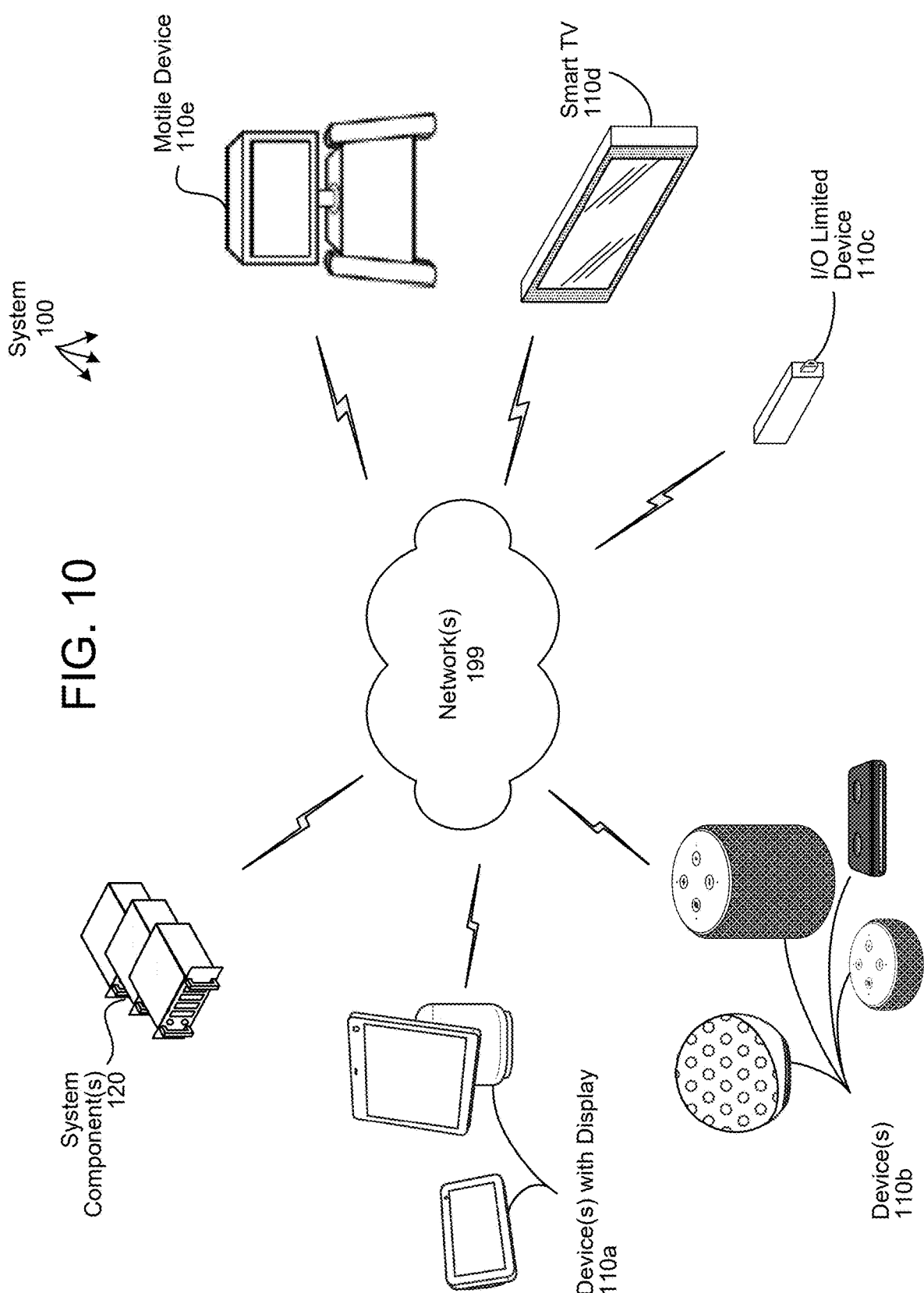
FIG. 10 illustrates an example of a computer network for use with the overall system, according to embodiments of the present disclosure.

As illustrated in FIG. 10, multiple devices (110a-110e, 120) may contain components of the system 100 and the devices (110/120) may be connected over a network(s) 199. The network(s) 199 may include a local or private network or may include a wide network such as the Internet. Devices may be connected to the network(s) 199 through either wired or wireless connections. For example, device(s) with display 110a, device(s) 110b, an input/output limited device 110c, a display/smart television 110d, and/or a motile device 110e may be connected to the network(s) 199 through a wireless service provider, over a Wi-Fi or cellular network connection, or the like. The one or more system component(s) 120 may be included as network-connected support devices, although the disclosure is not limited thereto. The system component(s) 120 may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    determining a preliminary embedding component configured to process content data to determine embedded content data, the preliminary embedding component corresponding to first parameter data;

determining a plurality of components configured to operate on embedded content data, the plurality of components comprising:

a first component configured to perform a first classification task using the embedded content data, a second component configured to perform a second classification task using the embedded content data, and a third component configured to perform a third classification task using the embedded content data;

determining training content data corresponding to training content;

processing a first portion of the training content data using the preliminary embedding component to determine training embedding content data;

processing the training embedding content data using the first component to determine first training classification data;

processing the training embedding content data using the second component to determine second training classification data;

processing the first training classification data and the second training classification data to determine training loss data;

adjusting the preliminary embedding component using the training loss data to determine an adjusted embedding component configured to process the content data to determine the embedded content data, the adjusted embedding component corresponding to second parameter data different from the first parameter data; and sending the adjusted embedding component to a user device.

2. The computer-implemented method of claim 1, further comprising, after sending the adjusted embedding component:

receiving, from the user device, first embedding content data determined by the adjusted embedding component based on first content data processed by the user device;

processing the first embedding content data using the third component to determine output data corresponding to the third classification task; and performing an action based at least in part on the output data.

3. The computer-implemented method of claim 1, further comprising, after sending the adjusted embedding component:

receiving, from the user device, first embedding content data determined by the adjusted embedding component based on first content data processed by the user device;

processing the first embedding content data using a fourth component to determine output data corresponding to a fourth classification task, wherein the plurality of components does not include the fourth component; and performing an action based at least in part on the output data.

4. The computer-implemented method of claim 1, further comprising:

processing a second portion of the training content data using the adjusted embedding component to determine second training embedding image data;

processing the second training embedding image data using the third component to determine third training classification data;

processing the third training classification data with respect to ground truth data to determine output data; and processing the output data to determine the third training classification data sufficiently corresponded to the ground truth data, wherein sending the adjusted embedding component is based at least in part on the third training classification data sufficiently corresponding to the ground truth data.

5. A computer-implemented method, comprising:

receiving, by a user device, first data representing first content to be output;

processing, by the user device, the first data using a first trained embedding component to determine first embedding data, wherein the trained embedding component was trained by adjusting embedding component parameters based on training results relative to operation of a plurality of components different than the trained embedding component and that are configured to process embedded media data;

sending, by the user device to a first processing component to perform a first task of a first type, the first embedding data, wherein the first processing component is different than the plurality of components;

after sending the first embedding data, receiving, by the user device, second data representing second content to be output;

processing, by the user device, the second data using the first trained embedding component to determine second embedding data; and sending, by the user device to a second processing component to perform a second task of the first type, the second embedding data, wherein the second processing component is configured differently from the first processing component.

6. The computer-implemented method of claim 5, further comprising, prior to receiving the first data by the user device:

determining a preliminary embedding component configured to process media data to determine embedded media data, the preliminary embedding component corresponding to first parameter data;

processing a first portion of training media data using the preliminary embedding component to determine training embedding data;

processing the training embedding data using a third processing component of the plurality of components to determine first training classification data;

processing the training embedding data using a third processing component of the plurality of components to determine second training classification data;

processing the first training classification data and the second training classification data to determine training loss data; and generating an adjusted preliminary embedding component using the training loss data to determine the trained embedding component, the trained embedding component corresponding to second parameter data different from the first parameter data.

7. The computer-implemented method of claim 6, further comprising, prior to receiving the first data by the user device:

processing a second portion of the training media data using the trained embedding component to determine second training embedding image data;

processing the second training embedding image data using a fourth processing component to determine third training classification data, wherein the fourth processing component is different from the plurality of components;

processing the third training classification data with respect to ground truth data to determine output data;

processing the output data to determine the third training classification data sufficiently corresponded to the ground truth data; and sending the trained embedding component to the user device.

8. The computer-implemented method of claim 7, wherein the fourth processing component comprises the first processing component.

9. The computer-implemented method of claim 5, wherein:

the first data comprises audio data; and the method further comprises processing the first embedding data by the first processing component to perform a first audio processing task corresponding to the first task.

10. The computer-implemented method of claim 5, wherein:

the first data comprises image data; and the method further comprises processing the first embedding data by the first processing component to perform a first image processing task corresponding to the first task.

11. The computer-implemented method of claim 5, further comprising:

processing the first data by an output component of the user device to cause presentation of the content.

12. A system, comprising:

at least one processor; and at least one memory comprising instructions that, when executed by the at least one processor, cause the system to:

receive, by a user device, first data representing content to be output;

determine a preliminary embedding component configured to process media data to determine embedded media data;

process a first portion of training media data using the preliminary embedding component to determine training embedding data;

process the training embedding data using a first processing component of a plurality of components to determine first training classification data;

process the training embedding data using a third processing component of the plurality of components to determine second training classification data;

process the first training classification data and the second training classification data to determine training loss data;

generate an adjusted preliminary embedding component using the training loss data to determine a trained embedding component;

process, by the user device, the first data using the trained embedding component to determine first embedding data; and send, by the user device to a second processing component to perform a first task, the first embedding data, wherein the second processing component is different than the plurality of components.

13. The system of claim 12, wherein the at least one memory further includes instructions that, when executed by the at least one processor, further cause the system to, prior to receipt of the first data by the user device:

wherein the preliminary embedding component corresponds to first parameter data; and wherein the trained embedding component corresponds to second parameter data different from the first parameter data.

14. The system of claim 12, wherein the at least one memory further includes instructions that, when executed by the at least one processor, further cause the system to, prior to receipt of the first data by the user device:

process a second portion of the training media data using the trained embedding component to determine second training embedding image data;

process the second training embedding image data using a fourth processing component to determine third training classification data, wherein the fourth processing component is different from the plurality of components;

process the third training classification data with respect to ground truth data to determine output data;

process the output data to determine the third training classification data sufficiently corresponded to the ground truth data; and send the trained embedding component to the user device.

15. The system of claim 14, wherein the fourth processing component comprises the second processing component.

16. The system of claim 12, wherein the first embedding data represents additional media information not used by the plurality of components.

17. The system of claim 12, wherein:

the first data comprises audio data; and the plurality of components comprises a first component configured to perform a first audio processing task and a second component configured to perform a second audio processing task.

18. The system of claim 12, wherein:

the first data comprises image data; and the plurality of components comprises a first component configured to perform a first image processing task and a second component configured to perform a second image processing task.

19. The system of claim 12, wherein the at least one memory further includes instructions that, when executed by the at least one processor, further cause the system to:

process the first data by an output component of the user device to cause presentation of the content.

* * * * *